(12) United States Patent
Park et al.

(10) Patent No.: US 12,010,363 B2
(45) Date of Patent: Jun. 11, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Junhyung Park, Suwon-si (KR); Hyuck Kang, Suwon-si (KR); Junheon Kim, Suwon-si (KR); Youngmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 17/437,171

(22) PCT Filed: Jun. 24, 2021

(86) PCT No.: PCT/KR2021/007932
§ 371 (c)(1),
(2) Date: Sep. 8, 2021

(87) PCT Pub. No.: WO2022/149672
PCT Pub. Date: Jul. 14, 2022

(65) Prior Publication Data
US 2023/0179812 A1    Jun. 8, 2023

(30) Foreign Application Priority Data

Jan. 5, 2021    (KR) .................. 10-2021-0001030

(51) Int. Cl.
*G06Q 30/00* (2023.01)
*G06Q 30/0241* (2023.01)
(Continued)

(52) U.S. Cl.
CPC ..... *H04N 21/2407* (2013.01); *G06Q 30/0248* (2013.01); *G06Q 30/0272* (2013.01);
(Continued)

(58) Field of Classification Search
CPC .................................................. G06Q 30/0248
See application file for complete search history.

(56) References Cited

U.S. PATENT DOCUMENTS

| | | | |
|---|---|---|---|
| 7,555,432 B1 * | 6/2009 | Gopalan | G10L 19/018 380/252 |
| 7,742,950 B2 * | 6/2010 | Wolinsky | G06Q 30/0273 705/27.1 |

(Continued)

FOREIGN PATENT DOCUMENTS

| | | | | |
|---|---|---|---|---|
| EP | 1983459 A2 * | 10/2008 | | G06F 21/10 |
| JP | 2018-536956 A | 12/2018 | | |

(Continued)

OTHER PUBLICATIONS

Shuai Liu et al. "Overview of correlation filter based algorithms in object tracking." (Jun. 9, 2020). Retrieved online Feb. 11, 2024. https://link.springer.com/article/10.1007/s40747-020-00161-4 (Year: 2020).*

(Continued)

*Primary Examiner* — James A Reagan
(74) *Attorney, Agent, or Firm* — Sughrue Mion, PLLC

(57) ABSTRACT

An electronic apparatus is provided. The electronic apparatus includes a memory, a communication interface, and a processor configured to: control the communication interface to transmit a content and a first track log request to an external device, obtain a first ratio value between a first track log response time corresponding to receipt of a first track log response and a predetermined first track log request time corresponding to the first track log request, control the communication interface to transmit a second track log request to the external device at a random time, identify whether a second track log response corresponding to the second track log request is received from the external device, and identify whether the content is reproduced (Continued)

normally based on any one or any combination of the first ratio value and whether the second track log response was received.

13 Claims, 18 Drawing Sheets

(51) Int. Cl.
  *G06Q 30/0272* (2023.01)
  *H04N 21/24* (2011.01)
  *H04N 21/442* (2011.01)
(52) U.S. Cl.
  CPC ... *G06Q 30/0277* (2013.01); *H04N 21/44204* (2013.01); *H04N 21/44213* (2013.01)

(56) References Cited

U.S. PATENT DOCUMENTS

| | | | | |
|---|---|---|---|---|
| 8,001,486 B2* | 8/2011 | Kumar | | H04N 7/24 |
| | | | | 702/108 |
| 8,968,077 B2* | 3/2015 | Weber | | H04L 67/53 |
| | | | | 709/217 |
| 9,152,977 B2* | 10/2015 | Zwicky | | G06Q 30/0225 |
| 9,514,462 B2* | 12/2016 | Murray | | G06Q 30/0601 |
| 9,578,350 B2* | 2/2017 | Zucchetta | | H04N 21/8126 |
| 10,643,234 B1* | 5/2020 | Dennis | | G06Q 30/0246 |
| 10,743,036 B1* | 8/2020 | Farris | | H04N 21/2353 |
| 10,789,629 B2* | 9/2020 | Murray | | G06F 21/10 |
| 10,929,879 B2* | 2/2021 | Cheng | | G06Q 30/0248 |
| 11,068,931 B1* | 7/2021 | Luttrell | | G06Q 30/0242 |
| 11,120,486 B2* | 9/2021 | Natarajan | | G06Q 30/0254 |
| 2001/0028662 A1* | 10/2001 | Hunt | | G06Q 30/02 |
| | | | | 370/389 |
| 2002/0082901 A1* | 6/2002 | Dunning | | G06Q 30/0631 |
| | | | | 705/14.69 |
| 2003/0229549 A1* | 12/2003 | Wolinsky | | G06Q 30/0273 |
| | | | | 705/14.69 |
| 2004/0192351 A1* | 9/2004 | Duncan | | G06Q 30/02 |
| | | | | 455/566 |
| 2008/0113684 A1* | 5/2008 | Jung | | H04W 74/0833 |
| | | | | 455/552.1 |
| 2008/0126159 A1* | 5/2008 | Wee | | G06Q 30/0204 |
| | | | | 705/7.33 |
| 2008/0301588 A1* | 12/2008 | Kumar | | H04N 7/24 |
| | | | | 702/108 |
| 2010/0105454 A1* | 4/2010 | Weber | | G07F 17/32 |
| | | | | 463/1 |
| 2010/0306249 A1* | 12/2010 | Hill | | G06F 16/9535 |
| | | | | 707/769 |
| 2013/0081073 A1* | 3/2013 | Kang | | H04N 21/4784 |
| | | | | 725/14 |
| 2013/0232038 A1* | 9/2013 | Murray | | G06F 21/10 |
| | | | | 705/26.1 |
| 2015/0310484 A1* | 10/2015 | Haile | | G06Q 30/0246 |
| | | | | 705/14.45 |
| 2016/0044387 A1* | 2/2016 | Zucchetta | | H04N 21/436 |
| | | | | 725/32 |
| 2016/0105691 A1* | 4/2016 | Zucchetta | | H04N 21/436 |
| | | | | 725/82 |
| 2016/0179900 A1* | 6/2016 | Stefik | | G06F 16/2379 |
| | | | | 707/771 |
| 2017/0053327 A1* | 2/2017 | Murray | | G06F 21/10 |
| 2018/0322172 A1* | 11/2018 | Stefik | | G06F 16/2379 |
| 2018/0322173 A1* | 11/2018 | Stefik | | G06Q 10/0639 |
| 2019/0026801 A1* | 1/2019 | Natarajan | | G06Q 30/0277 |
| 2020/0036768 A1* | 1/2020 | Bedi | | H04L 65/80 |
| 2022/0027345 A1* | 1/2022 | Wu | | G06F 21/64 |
| 2023/0179812 A1* | 6/2023 | Park | | H04N 21/44213 |
| | | | | 725/22 |

FOREIGN PATENT DOCUMENTS

| | | | | |
|---|---|---|---|---|
| JP | 2019-92067 A | 6/2019 | | |
| KR | 10-2008-0048185 A | 6/2008 | | |
| KR | 10-2014-0051115 A | 4/2014 | | |
| KR | 10-2014-0126215 A | 10/2014 | | |
| KR | 10-1954856 B1 | 6/2019 | | |
| KR | 10-2027409 B1 | 10/2019 | | |
| KR | 10-2020-0106674 A | 9/2020 | | |
| WO | WO-2004077793 A1 * | 9/2004 | | G06F 21/10 |
| WO | WO-2009150702 A1 * | 12/2009 | | G06Q 10/10 |
| WO | 2012/094417 A1 | 7/2012 | | |

OTHER PUBLICATIONS

Jeong Hoon Shin et al. "Robust Control for the Detection Threshold of CFAR Process in Cluttered Environments." (Jul. 13, 2020). Retrieved online Feb. 11, 2024. https://www.mdpi.com/1424-8220/20/14/3904 (Year: 2020).*

International Search Report (PCT/ISA/210) issued by the International Searching Authority in International Application No. PCT/KR2021/007932, dated Sep. 28, 2021.

Written Opinion (PCT/ISA/237) issued by the International Searching Authority in International Application No. PCT/KR2021/007932, dated Sep. 28, 2021.

* cited by examiner

FIG. 6

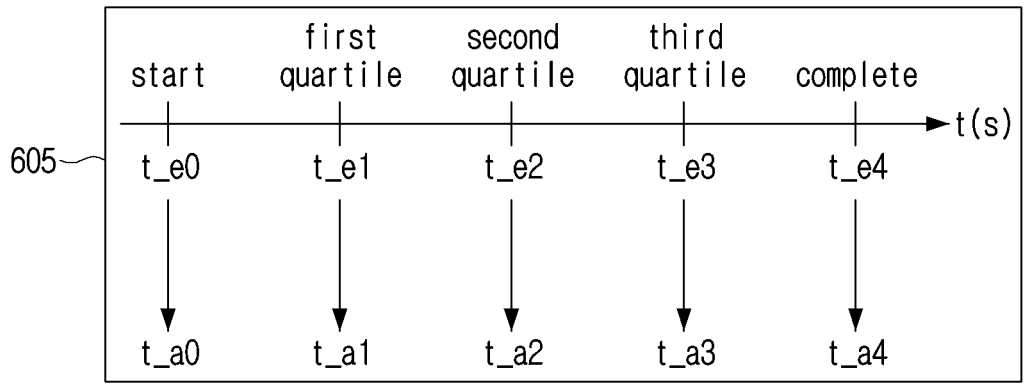

605 — timeline showing start ($t\_e0 \to t\_a0$), first quartile ($t\_e1 \to t\_a1$), second quartile ($t\_e2 \to t\_a2$), third quartile ($t\_e3 \to t\_a3$), complete ($t\_e4 \to t\_a4$)

610 — $\text{ratio value} = \dfrac{t\_ax}{t\_ex}$

615 — $\text{average ratio value} = \dfrac{1}{n}\sum_{x=1}^{n}\dfrac{t\_ax}{t\_ex}$ 620 — $\text{ratio value} = \dfrac{t\_ex - |t\_ex - t\_ax|}{t\_ex}$ 625 — $\text{average ratio value} = \dfrac{1}{n}\sum_{x=1}^{n}\dfrac{t\_ex - |t\_ex - t\_ax|}{t\_ex}$ 630 — $n\_s = \text{count (average ratio value} < \text{threshold)}$ 635 — $\text{Reliability} = 1 - \dfrac{n\_s}{n\_total}$

FIG. 15
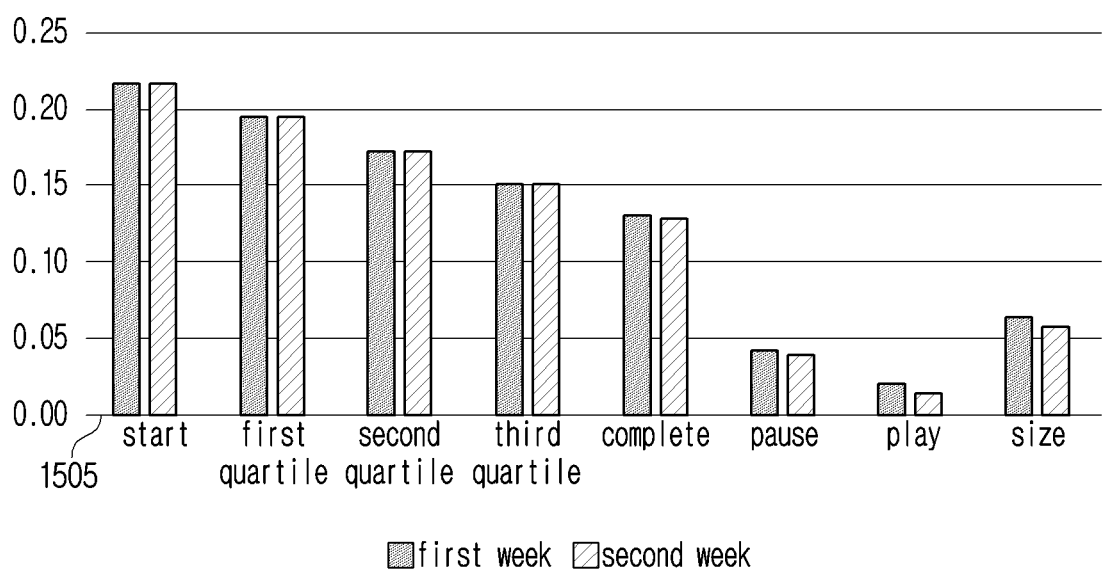
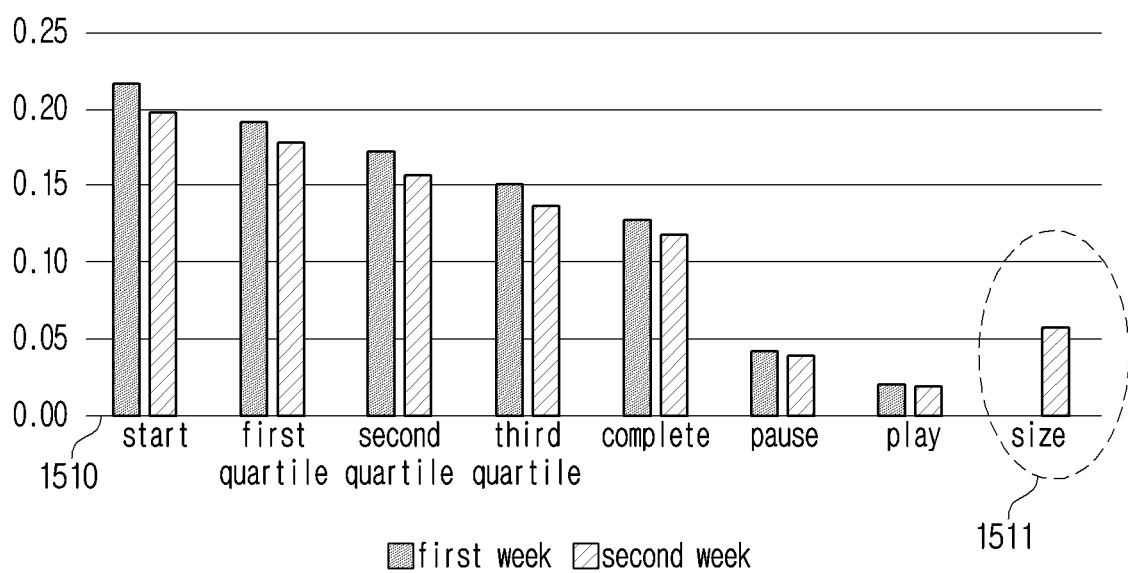

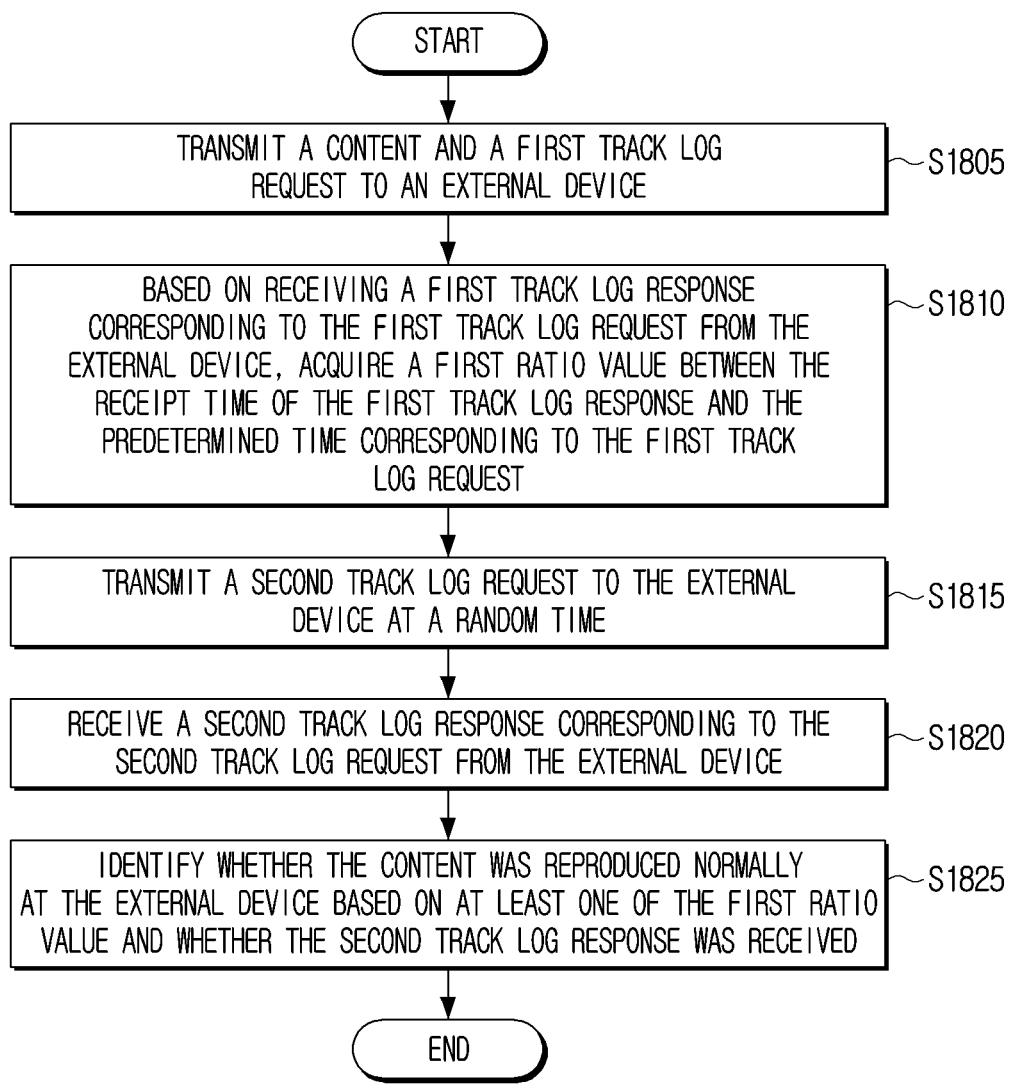

ELECTRONIC APPARATUS AND CONTROLLING METHOD THEREOF

TECHNICAL FIELD

The disclosure relates to an electronic apparatus and a control method thereof, and more particularly, to an electronic apparatus that requests a track log from an external device for identifying whether a content is being provided normally at the external device, and a control method thereof.

CROSS-REFERENCE TO RELATED APPLICATION(S)

This application claims benefit of priority to Korean Patent Application No. 10-2021-0001030, filed on Jan. 5, 2021, in the Korean Intellectual Property Office, the disclosure of which is incorporated by reference herein in its entirety.

BACKGROUND ART

AD-Tech may indicate an advertising technique combined with Information Technology (IT), and it may also indicate an on-line advertising matching platform. Also, AD-Tech may indicate a technology applied to connecting an advertiser and a publisher, and exposing an advertisement to consumers.

An advertiser may select one publisher among a plurality of publishers by using a demand side platform (DSP). Also, the demand side platform (DSP) may be connected with an ad exchange, an ad network, and a supply side platform (SSP), and select an advantageous publisher for the advertiser.

A publisher may be compensated by an advertiser in exchange for exposing an advertisement directly to consumers. Here, the publisher may be compensated based on the exposure time of the advertisement and the number of times of exposure of the advertisement. In this regard, there is a problem that the publisher or an intermediate platform may manipulate the exposure time of the advertisement and the number of times of exposure of the advertisement.

In order to prevent such manipulation, a publisher may provide a track log to the advertiser. However, the publisher or an intermediate platform may manipulate such a track log.

DISCLOSURE

Technical Problem

One or more embodiments address aspects of the aforementioned problems. One or more embodiments provide an electronic apparatus that receives a track log response corresponding to occurrence of a predetermined event and a track log response generated at a random time from an external device and identifies whether a content is reproduced normally, and a control method thereof.

Technical Solution

According to embodiments of the disclosure, an electronic apparatus includes: a memory; a communication interface; and a processor configured to: control the communication interface to transmit a content and a first track log request to an external device, based on a first track log response corresponding to the first track log request being received from the external device, obtain a first ratio value between a first track log response time corresponding to receipt of the first track log response and a predetermined first track log request time corresponding to the first track log request, control the communication interface to transmit a second track log request to the external device at a random time, identify whether a second track log response corresponding to the second track log request is received from the external device, and identify whether the content is reproduced normally based on any one or any combination of the first ratio value and whether the second track log response was received.

The processor may be further configured to: obtain a second ratio value between a second track log response time corresponding to receipt of the second track log response and a predetermined second track log request time corresponding to the second track log request, and identify whether the content is reproduced normally based on the first ratio value and the second ratio value.

The processor may be further configured to: identify whether the first ratio value is within a first threshold range, identify whether the second ratio value is within a second threshold range, and identify that the content was reproduced normally at the external device based on the first ratio value being within the first threshold range and the second ratio value being within the second threshold range. The second threshold range may be wider than the first threshold range.

The first track log request may include a control command requesting the external device to transmit a track log indicating whether a predetermined event occurred at the external device, and the predetermined event may include any one or any combination of a content start event, a content reproduction event, a content completion event, a temporary pause event, a reproduction input event, a forced termination event, a mute event, a volume change event, a screen size change event, a picture quality change event, and a reproduction speed change event.

The processor may be further configured to: count occurrences of the predetermined event and obtain an accumulated value corresponding to the predetermined event based on the first track log response, and identify whether the content is reproduced normally based on the accumulated value.

The processor may be further configured to identify the random time when the second track log request is transmitted based on the predetermined first track log request time.

The processor may be further configured to: control the communication interface to transmit the first track log request comprising a plurality of detailed requests to the external device; based on a plurality of first track log responses corresponding to the plurality of detailed requests received from the external device, obtain an average value of a plurality of first ratio values between a plurality of first track log response times corresponding to receipt of the plurality of first track log responses and a plurality of predetermined first track log request times corresponding to the plurality of detailed requests; and identify whether the content is reproduced normally based on the average value and whether the second track log response is received.

The plurality of first track log responses may include a first plurality of first track log responses received during a first period and a second plurality of first track log responses received during a second period. The processor may be further configured to: based on the first plurality of first track log responses, obtain first distribution rates of a plurality of respective events corresponding to the first plurality of first track log responses, based on the second plurality of first track log responses, obtain second distribution rates of the plurality of respective events corresponding to the second plurality of first track log responses, and identify whether the content is reproduced normally based on the first distribution rates and the second distribution rates.

A plurality of external devices may include the external device. The processor may be further configured to: control the communication interface to transmit the content and the first track log request to the plurality of external devices, obtain degrees of change respectively corresponding to the plurality of external devices based on the first plurality of first track log responses and the second plurality of first track log responses from the plurality of external devices, and based on a degree of change corresponding to one external device among the plurality of external devices being within a third threshold range, identify that the content was reproduced normally at the external device. The degree of change may be a value that relatively ranks the plurality of respective events that occurred during the first period and the second period at the external device based on the first plurality of first track log responses.

The processor may be further configured to obtain reliability of each of the plurality of external devices based on the first ratio value obtained from each of the plurality of external devices, whether the second track log response was received, and a difference value between the first distribution rates and the second distribution rates.

According to embodiments of the disclosure, a method of controlling an electronic apparatus includes: transmitting a content and a first track log request to an external device; receiving a first track log response corresponding to the first track log request from the external device; based on the first track log response being received, obtaining a first ratio value between a first track log response time corresponding to receipt of the first track log response and a predetermined first track log request time corresponding to the first track log request; transmitting a second track log request to the external device at a random time; identifying whether a second track log response corresponding to the second track log request is received from the external device; and identifying whether the content is reproduced normally based on any one or any combination of the first ratio value and whether the second track log response was received.

The method may further include obtaining a second ratio value between a second track log response time corresponding to receipt of the second track log response and a predetermined second track log request time corresponding to the second track log request. The identifying whether the content is reproduced normally may include identifying whether the content is reproduced normally based on the first ratio value and the second ratio value.

The identifying whether the content is reproduced normally may include: identifying whether the first ratio value is within a first threshold range; identifying whether the second ratio value is within a second threshold range; and identifying that the content was reproduced normally at the external device based on the first ratio value being within the first threshold range and the second ratio value being within the second threshold range. The second threshold range may be wider than the first threshold range.

The first track log request may include a control command requesting the external device to transmit a track log indicating whether a predetermined event occurred at the external device, and the predetermined event may include any one or any combination of a content start event, a content reproduction event, a content completion event, a temporary pause event, a reproduction input event, a forced termination event, a mute event, a volume change event, a screen size change event, a picture quality change event, and a reproduction speed change event.

The method may further include: counting occurrences of the predetermined event and obtaining an accumulated value corresponding to the predetermined event based on the first track log response. The identifying whether the content is reproduced normally may include identifying whether the content is reproduced normally based on the accumulated value.

DESCRIPTION OF DRAWINGS

The above and other aspects, features, and advantages of certain embodiments of the present disclosure will be more apparent from the following description taken in conjunction with the accompanying drawings, in which:

FIG. 6 is a diagram for illustrating a feature of obtaining a ratio value and an average value according to an embodiment;

FIG. 15 is a diagram for illustrating distribution rates of respective events at different times of some external devices according to an embodiment;

FIG. 18 is a diagram for illustrating a control method of an electronic apparatus according to an embodiment.

MODE FOR INVENTION

Figure 1:
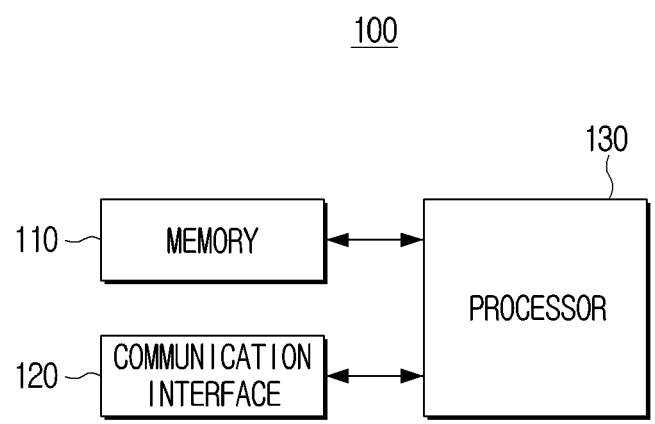
FIG. 1 is a block diagram illustrating an electronic apparatus according to an embodiment.

Hereinafter, embodiments will be described in detail with reference to the accompanying drawings.

Throughout the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there are terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, in this specification, expressions such as "have," "may have," "include," and "may include" should be construed as denoting that there are such characteristics (e.g.: elements such as numerical values, functions, operations, and components), and the terms are not intended to exclude the existence of additional characteristics.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, the terms "1st" or "first" and "2nd" or "second" may use corresponding component regardless of importance or order and are used to distinguish a component from another without limiting the components.

The description in the disclosure that one element (e.g.: a first element) is "(operatively or communicatively) coupled with/to" or "connected to" another element (e.g.: a second element) should be understood as including both the case where the one element is directly coupled to the another element, and the case where the one element is coupled to the another element through still another element (e.g.: a third element).

Also, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and it may be implemented as hardware or software, or as a combination of hardware and software. Further, a plurality of "modules" or "parts" may be integrated into at least one module and implemented as at least one processor, except "modules" or "parts" that need to be implemented as specific hardware.

Also, in this specification, the term "user" may refer to a person who uses an electronic apparatus or an apparatus using an electronic apparatus (e.g.: an artificial intelligence electronic apparatus).

Hereinafter, an embodiment will be described in more detail with reference to the accompanying drawings.

FIG. 1 is a block diagram illustrating an electronic apparatus according to an embodiment.

Referring to FIG. 1, the electronic apparatus 100 may include a memory 110, a communication interface 120, and a processor 130.

The electronic apparatus 100 may be a server that provides a content (e.g., an advertising content). That is, the electronic apparatus 100 may be a server related to an advertiser.

An electronic apparatus according to the various embodiments may include, for example, at least one of a smartphone, a tablet personal computer (PC), a mobile phone, a desktop PC, a laptop PC, a personal digital assistant (PDA), or a portable multimedia player (PMP). In some embodiments, the electronic apparatus 100 may include, for example, at least one of a television, a digital video disk (DVD) player, or a media box (e.g.: Samsung HomeSync™, Apple TV™, or Google TV™).

The memory 110 may be implemented as an internal memory such as a ROM (e.g., an electrically erasable programmable read-only memory (EEPROM)), a RAM, etc., included in the processor 130, or as a separate memory from the processor 130. In this case, the memory 110 may be implemented in the form of a memory embedded in the electronic apparatus 100, or in the form of a memory that can be attached to or detached from the electronic apparatus 100 according to the use of stored data. For example, in the case of data for driving the electronic apparatus 100, the data may be stored in a memory embedded in the electronic apparatus 100, and in the case of data for the extended function of the electronic apparatus 100, the data may be stored in a memory that can be attached to or detached from the electronic apparatus 100.

In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the electronic apparatus 100, the memory may be implemented as forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The communication interface 120 is a component used to perform communication with various types of external devices according to various types of communication methods. The communication interface 120 includes a Wi-Fi module, a Bluetooth module, an infrared communication module, a wireless communication module, etc. Here, each communication module may be implemented in the form of at least one hardware chip.

A Wi-Fi module and a Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter.

An infrared communication module performs communication according to an Infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd generation (3G), 3rd generation partnership project (3GPP), Long Term Evolution (LTE), LTE Advanced (LTE-A), 4th Generation (4G), 5th Generation (5G), etc. Embodiments are not limited thereto, and wireless communication protocols other than the aforementioned communication methods may be used.

Other than the above, the communication interface 120 may include at least one of a local area network (LAN) module, an Ethernet module, or a wired communication module that performs communication by using a pair cable, a coaxial cable, an optical fiber cable, or an ultra-wideband (UWB) module, etc.

The processor 130 may perform overall control operations of the electronic apparatus 100. Specifically, the processor 130 performs a function of controlling the overall operations of the electronic apparatus 100.

The processor 130 may be implemented as a digital signal processor (DSP) processing digital signals, a microprocessor, and a time controller (TCON). However, embodiments are not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). In addition, the processor 130 may perform various functions by executing computer executable instructions stored in the memory 110.

The processor 130 may control the communication interface 120 to transmit a content and a first track log request to an external device 200, receive a first track log response corresponding to the first track log request from the external device 200. When the first track log response is received, the processor 130 may obtain a first ratio value between a time when the first track log response was received and a predetermined time corresponding to the first track log request, control the communication interface 120 to transmit a second track log request to the external device 200 at a random time, identify whether a second track log response corresponding to the second track log request is received from the external device 200, and identify whether the content is reproduced normally based on at least one of the first ratio value or whether the second track log response was received.

Here, the content may include an advertising content provided by an advertiser. An advertising content may include at least one of a text, an image, or a moving image. Here, reproduction of a content may be an operation of exposing an advertising content to consumers. For example, the advertising content may be exposed by displaying the text, the image, and/or the moving image. Accordingly, reproduction of a content may also be changed to an expression such as exposure of a content or provision of a content.

Here, the external device 200 may be a publisher who exposes an advertising content to consumers. For example, the external device 200 may be an Internet server that can provide an advertisement banner on-line.

Here, the first track log request may indicate a request for a track log indicating reproduction of a content or exposure of a content. The electronic apparatus 100 needs to check whether an advertising content was actually exposed on an advertisement banner owned by the external device 200. Accordingly, the processor 130 may request a track log from the external device 200.

Here, a track log may be used for identifying whether the external device 200 is reproducing a content normally. Also, a track log may indicate a log corresponding to various events related to reproduction of a content at the external device 200.

The first track log request may include a control command requesting the external device 200 to transmit a track log regarding whether a predetermined event occurred at the external device 200.

The first track log request may be a log request corresponding to a predetermined event. Here, a predetermined event may include at least one event among a content start event, a content reproduction event, a content completion event, a temporary pause event, a reproduction input event, a forced termination event, a mute event, a volume change event, a screen size change event, a picture quality change event, or a reproduction speed change event.

Here, a content reproduction event may indicate an event wherein a content is reproduced at a specific time point. Here, a specific time point may indicate an expected time for identifying reproduction of a content, and it may be defined in a predetermined unit. As an example, a predetermined unit may be a quartile. The total content reproduction time may be divided into four, and a predetermined event may indicate an event of identifying whether the content is reproduced in a first quartile time (or a reproduction event of a first quartile time), an event of identifying whether the content is reproduced in a second quartile time (or a reproduction event of a second quartile time), an event of identifying whether the content is reproduced in a third quartile time (or a reproduction event of a third quartile time), and an event of identifying whether the content is reproduced in a fourth quartile time (or a reproduction event of a fourth quartile time). Here, the event of identifying whether the content is reproduced in the fourth quartile time may correspond to a content completion event.

For example, a content may be 16 seconds. The time corresponding to the first quartile may be 4 seconds, the time corresponding to the second quartile may be 8 seconds, the time corresponding to the third quartile may be 12 seconds, and the time corresponding to the fourth quartile may be 16 seconds. The predetermined event may indicate an event of identifying whether the content is reproduced at 4 seconds, 8 seconds, 12 seconds, and 16 seconds.

An expected time for identifying reproduction of a content may be defined by various methods other than a quartile.

When the external device 200 receives the first track log request from the electronic apparatus 100, the external device 200 may generate a first track log response corresponding to the first track log request. Here, the first track log response may be a response regarding whether a predetermined event corresponding to the first track log request occurred. The external device 200 may identify in real time whether a predetermined event included in the first track log request occurs, and generate a first track log response when the predetermined event occurred. Then, the external device 200 may transmit the generated first track log response to the electronic apparatus 100.

Here, the first track log response may include track log information related to generation of a predetermined event. Here, the track log information related to generation of a predetermined event may include at least one of the time when the predetermined event occurred, the time when the predetermined event was performed (e.g., the time of maintaining a temporary pause state, the time of maintaining a mute state), or detailed information of the predetermined event.

Here, the detailed information of the predetermined event may indicate additional information related to the event. For example, detailed information of a volume change event may indicate the size the volume before the change and the size of the volume after the change. Detailed information of a screen size change event may indicate the screen size before the change and the screen size after the change. Detailed information of a picture quality change event may indicate the picture quality before the change and the picture quality after the change.

Here, the first track log response may additionally include proving data that proves generation of a track log. The proving data may be data that can prove that the first track log response was not manipulated or falsified.

The processor 130 may receive the first track log response from the external device 200 and obtain the time when the first track log response was received. Then, the processor 130 may obtain a first ratio value between the time when the first track log response was received and a predetermined time corresponding to the first track log request.

Here, the predetermined time corresponding to the first track log request may indicate the expected time of occurrence of an event corresponding to the first track log request. In case a plurality of types of events are included in the first track log request, expected times corresponding to the plurality of respective events may exist. Here, an expected time may not exist for every event. For example, for a mute event, an expected time may not exist.

According to an embodiment, events of which expected times are designated (e.g., a reproduction event of the first quartile time) will be described below in FIG. 2, and events of which expected times are not designated (e.g., a mute event) will be described below in FIG. 3.

Here, the first track log request may include an event of identifying reproduction of a content. Here, an expected time for identifying reproduction of a content may be predetermined. As in the aforementioned example, an expected time for identifying reproduction of a content may be determined based on a quartile.

The processor 130 may analyze information included in the received first track log response, and obtain at least one of the type of the event or the time of generation of the event. For example, the processor 130 may analyze a track log included in the first track log response, and obtain information corresponding to generation of the first track log response based on a content reproduction event of the first quartile time and information on the time of generation of a content start event.

Here, the information on the time of generation of the event included in the first track log response and the information on the time of receipt of the first track log response obtained at the processor 130 may have overlapping values. For obtaining a first ratio value, the processor 130 may use at least one of the information on the time of generation of the event included in the first track log response or the information on the time of receipt of the first track log response. For the convenience of explanation, an embodiment wherein the information on the time of receipt of the first track log response is used will be described.

The processor 130 may identify an event (or a type of an event) based on the first track log response, and identify a predetermined time (or an expected time) corresponding to the identified event. Then, the processor 130 may obtain a first ratio value based on the predetermined time corresponding to the identified event and the time of receipt of the first track log response.

Here, the predetermined time corresponding to the identified event may indicate a predetermined time corresponding to the first track log request. Here, the first ratio value may be a value for determining how faster or how later the actual response (the first track log response) was received.

For example, the processor 130 may transmit a content having a reproduction time of 16 seconds and the first track log request to the external device 200. The electronic apparatus 100 may receive the first track log response from the external device 200 3 seconds after sending the first track log request to the external device 200. The processor 130 may analyze the first track log response and identify the type of the event as a reproduction event of the first quartile time, and identify that the time of receipt of the first track log response is 3 seconds.

Here, the processor 130 may identify that the predetermined time (or the expected time) corresponding to the identified reproduction event of the first quartile time is 4 seconds.

Here, the processor 130 may obtain a first ratio value (3/4) based on the time of receipt of the first track log response (3 seconds) and the predetermined time corresponding to the first track log request (4 seconds).

Here, the first ratio value may be indicative of how close to the expected time the response was received. That is, as the first ratio value is closer to 1, it can be deemed that the response was received correspondingly to the expected time, and as the first ratio value becomes farther from 1, it can be deemed that the response was received not correspondingly to the expected time.

The processor 130 may identify whether the content is reproduced normally based on a threshold range or a threshold value corresponding to the first ratio value.

According to an embodiment, if the first ratio value is within the threshold range, the processor 130 may identify that the content is being reproduced normally at the external device 200. If the first ratio value is outside the threshold range, the processor 130 may identify that the content is not being reproduced normally at the external device 200.

According to another embodiment, if the first ratio value is greater than or equal to the threshold value, the processor 130 may identify that the content is being reproduced normally at the external device 200. If the first ratio value is smaller than the threshold value, the processor 130 may identify that the content is not being reproduced normally at the external device 200.

Detailed explanation regarding the first ratio value will be made below in FIG. 6.

According to an embodiment, the first track log request may include a plurality of detailed requests. For example, the first track log request may include a plurality of detailed requests requesting to transmit responses corresponding to a plurality of respective events. For example, the first track log request may include a first request (a first detailed request) and a second request (a second detailed request). The first request may request the external device 200 to generate a track log corresponding to a content start event and transmit the track log. The second request may request the external device 200 to generate a track log corresponding to a content reproduction event of a time corresponding to the first quartile and transmit the track log.

According to another embodiment, the first track log request may be described as one request. Here, the processor 130 may transmit the first track log requests corresponding to the respective events to the external device 200. For example, the processor 130 may transmit the first track log request to the external device 200 requesting the external device 200 to generate a track log corresponding to a content start event, and the electronic apparatus 100 may transmit the track log and the first track log request to the external device 200 requesting the external device 200 to generate a track log corresponding to a content reproduction event of a time corresponding to the first quartile and transmit the track log to the electronic apparatus 100.

The processor 130 may transmit a second track log request to the external device 200. Here, the second track log request may be a request for identifying reproduction of the content at a random time. Specifically, the second track log request may be a request requesting the external device 200 to transmit a track log to the electronic apparatus 100 proving that the content is currently being reproduced. As the first track log request causes the external device 200 to transmit a response corresponding to a predetermined schedule, the schedule may be identified in advance at the external device 200 and a response may be transmitted. For example, even if an advertisement is not actually exposed, the advertisement may be exposed only at an expected time corresponding to a predetermined event. With respect to such an act, distinction cannot be made with the first track log request and the first track log response alone. Accordingly, the processor 130 may transmit a second track log request to the external device 200 requesting a track log at a random time.

The processor 130 may determine a random time of transmitting the second track log request to the external device 200 based on the predetermined time corresponding to the first track log request.

Here, the processor 130 may determine the random time in consideration of the predetermined time corresponding to the first track log request. Generation of a track log at the same time at a time that corresponds to the first track log request may not provide additional information. Accordingly, the processor 130 may transmit the second track log request requesting to transmit the second track log response at a random time among times other than the predetermined time corresponding to the first track log request to the external device 200.

When the external device 200 receives the second track log request from the electronic apparatus 100, the external device 200 may generate the second track log response including a track log for proving reproduction of the content, and transmit the generated second track log response to the electronic apparatus 100.

The electronic apparatus 100 may receive the second track log from the external device 200. The processor 130 may identify whether the second track log response corresponding to the second track log request is received. When the second track log response is received by the electronic apparatus 100, the processor 130 may identify that the content is being reproduced normally at the external device 200. If the second track log response is not received, the processor 130 may identify that the content is not being reproduced normally at the external device 200.

Here, the processor 130 may additionally identify whether the second track log response is received from the external device 200 within a threshold time. Specifically, the processor 130 may identify whether the second track log response is received within 3 seconds after transmitting the second track log request. If the second track log response is not received within the threshold time after transmitting the second track log request, the processor 130 may identify that the content is not being reproduced normally at the external device 200.

A specific operation related to the second track log response will be described below in FIG. 4.

The processor 130 may identify whether a content is reproduced normally in consideration of at least one of the first track log response or the second track log response.

As an example, the processor 130 may determine whether a content is reproduced normally by using only the first track log response.

As another example, the processor 130 may determine whether a content is reproduced normally by using only the second track log response.

As still another example, the processor 130 may determine whether a content is reproduced normally by using both of the first track log response and the second track log response.

Here, determining whether a content is reproduced normally may include determining whether a content is being provided normally to consumers. An advertiser should compensate (e.g., pay an advertising cost) to a publisher who exposes an advertisement. However, a publishes may inaccurately increase the number of times the advertisement has been exposed in an effort to increase the compensation. For example, the publisher may be running an advertising scam. For example, as advertising scams, the number of clicks may be manipulated, the viewing time may be manipulated, the number of times of viewing may be manipulated, etc. Accordingly, the processor 130 may determine whether a content is reproduced normally in order to distinguish from an advertisement scam.

The processor 130 may obtain a second ratio value between the time when the second track log response was received and a predetermined time corresponding to the second track log request, and identify whether the content is reproduced normally based on the first ratio value and the second ratio value.

Here, the second track log request may be a request requesting to generate a track log for proving reproduction of the content at a random time. Here, the predetermined time corresponding to the second track log request may be a time for inducing the external device 200 to provide a response within a threshold time. For example, the predetermined time may be determined such that a track log is requested at a random time and a response is received within 3 seconds. If a response is received by the electronic apparatus 100 from the external device 200 within 3 seconds, the processor 130 may determine that the content was reproduced normally at the external device 200.

Here, the second ratio value may be a value for determining whether the response was received within the threshold time. Also, the second ratio value may be a value of dividing the time of receipt of the second track log response by the predetermined time corresponding to the second track log request.

As the second ratio value decreases, it may be identified that the second track log response was received relatively quickly. As the second ratio value increases, it may be identified that the second track log response was received after a relatively long period of time. Also, as the second ratio value is bigger, the response reaction is slow, and thus it may be determined that it is highly likely that the content is not reproduced normally.

For example, the predetermined time corresponding to the second track log request may be 3 seconds, and the second track log request was transmitted. As an example, if the second track log response is received within 1 second of the second track log request being transmitted, the second ratio value may be 1/3. As another example, if the second track log response is received within 3 seconds of the second track log request being transmitted, the second ratio value may be 3/3. Accordingly, as the second track log response is later, the second ratio value may increase.

If the first ratio value is within the first threshold range, and the second ratio value is within the second threshold range, the processor 130 may identify that the content was reproduced at the external device 200. For example, the second threshold range may be wider than the first threshold range.

The closer the first ratio value is to 1, the higher the probability of normal reproduction of the content. Also, the close the second ratio value is to 0, the higher the probability of normal reproduction of the content. Accordingly, the first threshold range and the second threshold range may be different, and the second threshold range may have a wider range than the first threshold range.

For example, the first threshold range may be 0.75 to 1.25, and the second threshold range may be 0 to 1.

If it is identified that the first track log response is a track log generated based on occurrence of a predetermined event, the processor 130 may count the occurrences of the predetermined event and obtain an accumulated value, and identify whether the content is reproduced normally based on the obtained accumulated value.

The first track log request may be a control command requesting the external device 200 to transmit a response when a predetermined event occurs, and the first track log response may include a track log proving occurrence of an event when a predetermined event occurs at the external device 200. The processor 130 may identify by which event among a plurality of predetermined events the first track log response received from the external device 200 was generated.

Also, the processor 130 may receive a plurality of first track log responses. Accordingly, whenever a first track log response is received, the processor 130 may count by which event the response was generated. Then, the processor 130 may obtain accumulated values for respective events based on receiving a plurality of first track log responses.

For example, the processor 130 may identify that there were 10 times (the accumulated value is 10) of a content start event, 5 times (the accumulated value is 5) of a content completion event, and 10 times (the accumulated value is 10) of a screen size change event.

Also, if the accumulated value of a target event among the plurality of predetermined events is greater than or equal to a threshold value, the processor 130 may identify that the content is not being reproduced normally at the external device 200. Here, the target event may be an event wherein an advertisement scam is suspected. For example, the target event may be a screen size change event. As it can be manipulated that the advertisement is exposed to consumers by changing the screen size unilaterally, the processor 130 may determine whether the content is reproduced normally by considering the accumulated value of the screen size change event.

The processor 130 may control the communication interface 120 to transmit the first track log request including a plurality of detailed requests to the external device 200, and receive a plurality of first track log responses corresponding to the plurality of detailed requests from the external device 200. When the plurality of first track log responses are received, the processor 130 may obtain an average value of a plurality of first ratio values between the time when the plurality of first track log responses were received and a predetermined time corresponding to the plurality of detailed requests, and identify whether the content is reproduced normally based on the obtained average value and whether a second track log response is received.

For example, the first track log request may include a first detailed request requesting a response when a content reproduction event of the first quartile occurs and a response when a content reproduction event of the second quartile occurs is assumed. A predetermined time corresponding to the first detailed request may be 4 seconds, and a predetermined time corresponding to the second detailed request may be 8 seconds. Here, a response corresponding to the first detailed request is received at 3 seconds, and a response corresponding to the second detailed request is received at 7 seconds.

For example, the processor 130 may obtain the first ratio value (3/4) based on the time when a response corresponding to the first detailed request is received (3 seconds) and the predetermined time corresponding to the first detailed request (4 seconds). Then, the processor 130 may obtain the first ratio value (3/4) based on the time when a response corresponding to the second detailed request is received (7 seconds, i.e., 3 seconds after the predetermined time corresponding to the first detailed request) and the predetermined time corresponding to the second detailed request (8 seconds, i.e., 4 seconds after the predetermined time corresponding to the first detailed request). Then, the processor 130 may obtain an average value (3/4) of the obtained first ratio values.

The processor 130 may obtain the first distribution rates of the plurality of respective events corresponding to the plurality of first track log responses based on the plurality of first track log responses received during the first period, and obtain the second distribution rates of the plurality of respective events corresponding to the plurality of first track log responses based on the plurality of first track log responses received during the second period, and identify whether the content is reproduced normally based on the first distribution rates and the second distribution rates.

The processor 130 may analyze the first track log responses received during the first period. Specifically, the processor 130 may identify the types of predetermined events wherein the plurality of received first track log responses were generated and obtain accumulated values for the respective events. Then, the processor 130 may obtain the first distribution rates of the accumulated values of the respective events obtained during the first period.

For example, the processor 130 may obtain the accumulated values of the plurality of respective events received during the first period (e.g., the first week). Here, the processor 130 may identify that the number of times of a content start event is 10 times (the accumulated value is 10), the number of times of a content completion event is 5 times (the accumulated value is 5), and the number of times of a screen size change event is 10 times (the accumulated value is 10). Here, the total number of times of the event has been received may be 25 times, the distribution rate of the content start events may be 0.4, the distribution rate of the content completion events may be 0.2, and the distribution rate of the screen size change events may be 0.4. Here, the first distribution rate may indicate the distribution rate of each event.

Likewise, the processor 130 may analyze the first track log responses received during the second period, and obtain the second distribution rate.

For example, the processor 130 may obtain the accumulated values of the plurality of respective events received during the second period (the second week). Here, the processor 130 may identify that the number of times of a content start event is 10 times (the accumulated value is 10), the number of times of a content completion event is 10 times (the accumulated value is 10), and the number of times of a screen size change event is 5 times (the accumulated value is 5). Here, the number of times of the received total events may be 25 times, the distribution rate of the content start events may be 0.4, the distribution rate of the content completion events may be 0.4, and the distribution rate of the screen size change events may be 0.2. Here, the first distribution rate may indicate the distribution rate of each event.

Here, the processor 130 may calculate a difference value between the first distribution rate during the first period and the second distribution rate during the second period for each event.

For example, as the distribution rate of the content start events during the first period is 0.4 and the distribution rate of the content start events during the second period is 0.4, the difference value between the distribution rates of the content start events occurred during the first period and the second period may be 0.

For example, as the distribution rate of the content completion events during the first period is 0.2 and the distribution rate of the content completion events during the second period is 0.4, the difference value between the distribution rates of the content completion events occurred during the first period and the second period may be 0.2.

For example, as the distribution rate of the screen size change events during the first period is 0.4 and the distribution rate of the screen size change events during the second period is 0.2, the difference value between the distribution rates of the screen size change events occurred during the first period and the second period may be 0.2.

Here, the processor 130 may identify whether the content is reproduced normally based on a difference value of distribution rates of a specific event. If the difference value of the distribution rates of a specific event is outside a threshold range, the processor 130 may identify that the content is not being reproduced normally.

The processor 130 may obtain an average of difference values. Then, the processor 130 may store the obtained average of difference values in the memory 110 as the change rate of the external device 200.

For example, as the difference value of the distribution rates of the content start events is 0, the difference value of the distribution rates of the content completion events is 0.2, and the difference value of the distribution rates of the screen size change events is 0.2, the processor 130 may obtain the average of the difference values as 0.13. The value of 0.13 may indicate the change rate of the entire external device 200 corresponding to specific periods (the first period and the second period).

The processor 130 may obtain a change rate of the external device 200 corresponding to the first period and the second period. For one external device 200, one change rate may exist. If there are a plurality of external devices 200, the processor 130 may obtain a plurality of change rates. Then, the processor 130 may obtain degrees of change corresponding to the respective external devices 200 based on the plurality of change rates.

Here, a change rate may indicate how much the distribution rate of an event changed between the first period and the second period. That is, a change rate may be information obtained by analyzing only the first track log responses received at one external device 200-1.

Here, a degree of change may indicate to which distribution among the change rates of the plurality of external devices 200-1 to 200-n the change rate of the one first external device 200-1 belongs. That is, a degree of change may indicate how much the change rate of the one first external device 200-1 changed relatively. Detailed explanation regarding a degree of change will be made below in FIG. 14.

The processor 130 may control the communication interface 120 to transmit the content and the first track log request including a plurality of detailed requests to the plurality of external devices 200-1 to 200-n, and receive a plurality of first track log responses received from the plurality of external devices 200-1 to 200-n during the first period and the second period. The processor 130 may obtain degrees of change corresponding to the plurality of respective external devices based on the plurality of first track log responses received from the plurality of external devices 200-1 to 200-n during the first period and the second period. If an obtained degree of change is within the third threshold range, the processor 130 may identify that the content was reproduced normally at the external device. Here, a degree of change may be a value that relatively ranks (or indicates) change of distribution of an event occurred between the first period and the second period based on the plurality of first track log responses.

For example, the change of distribution (change rate) of the first external device may be 0.13, the change of distribution (change rate) of the second external device may be 0.2, and the change of distribution (change rate) of the third external device may be 0.3. Here, it may be determined that the change of distribution of the first external device is relatively low, and the change of distribution of the third external device is relatively high.

A degree of change may indicate the relative location of one distribution change data in the entire distribution change data. Accordingly, the processor 130 may relatively determine whether there was a change in the event distribution at a specific external device based on a degree of change.

In the aforementioned description, for obtaining a degree of change, calculating operations of obtaining difference values by comparing distribution rates of respective events during the first period and distribution rates of respective events during the second period, and using the average of the obtained difference values were performed. However, instead of using the aforementioned operations of calculating difference values and calculating the average, the processor 130 may use a separate predefined function for obtaining a degree of change.

Here, a predefined function may be Kullback-Leibler divergence (KL divergence, KLD). Specifically, the processor 130 may obtain a degree of change corresponding to Kullback-Leibler divergence based on the distribution rates of the respective events during the first period and the distribution rates of the respective events during the second period. Here, the degree of change may refer to a value related to one external device, and the processor 130 may obtain degrees of change for the plurality of respective external devices. Detailed explanation in this regard will be made below in FIG. 14.

The processor 130 may obtain reliability of the plurality of respective external devices 200 based on the first ratio values obtained from the plurality of respective external devices 200, whether the second track log response was received, and difference values between the first distribution rates and the second distribution rates.

Here, reliability may indicate a probability value related to whether the content is reproduced normally. Accordingly, as the reliability increases, the probability of regarding that the content was reproduced normally increases.

According to an embodiment, reliability corresponding to one external device may be calculated only with the first track log responses received from the one external device. The processor 130 may obtain reliability based on the total number of times of occurrence of events and the ratio of the number of times that it was identified that the content was not reproduced normally.

Specifically, the processor 130 may count the number of times that the average of the first ratio values is smaller than a threshold value for a specific event. Then, the processor 130 may obtain reliability based on the ratio of the number of times that the average of the first ratio values is smaller than the threshold value in the total number of times of occurrence of events.

A detailed process of obtaining reliability in this regard will be described below in FIG. 6.

According to another embodiment, reliability corresponding to one external device may be calculated in consideration of all of the first track log responses received from a plurality of external devices.

An external device that does not reproduce content normally may not necessarily be running an advertising scam. Accordingly, it may be repetitively identified whether the content was reproduced normally and a screening inspection may be additionally performed targeted to an external device wherein the number of times that it was identified that the content was reproduced abnormally is high.

The electronic apparatus 100 identifies whether a content is reproduced normally through various embodiments for preventing advertising scams that are done in the field of the AD-Tech. Specifically, the electronic apparatus 100 requests a track log for proving reproduction of a content at a random time which is not a predetermined event. Accordingly, it may be difficult for the external device 200 to artificially manipulate a track log for preparing for a track log to be generated at a random time.

Also, the electronic apparatus 100 may analyze responses for a plurality of external devices. Accordingly, the processor 130 may determine an artificial external device that manipulates a track log based on distribution rates of respective events of an external device that normally provides an advertisement to consumers. Although the electronic apparatus 100 distinguishes normal distribution and abnormal distribution, an external device does not have all data related to a plurality of external devices, and thus it cannot identify normal distribution. Accordingly, it may be difficult for an external device to artificially manipulate data.

In the above description, only simple components constituting the electronic apparatus 100 were illustrated and described, but in actual implementation, various components may additionally be provided.

Figure 2:
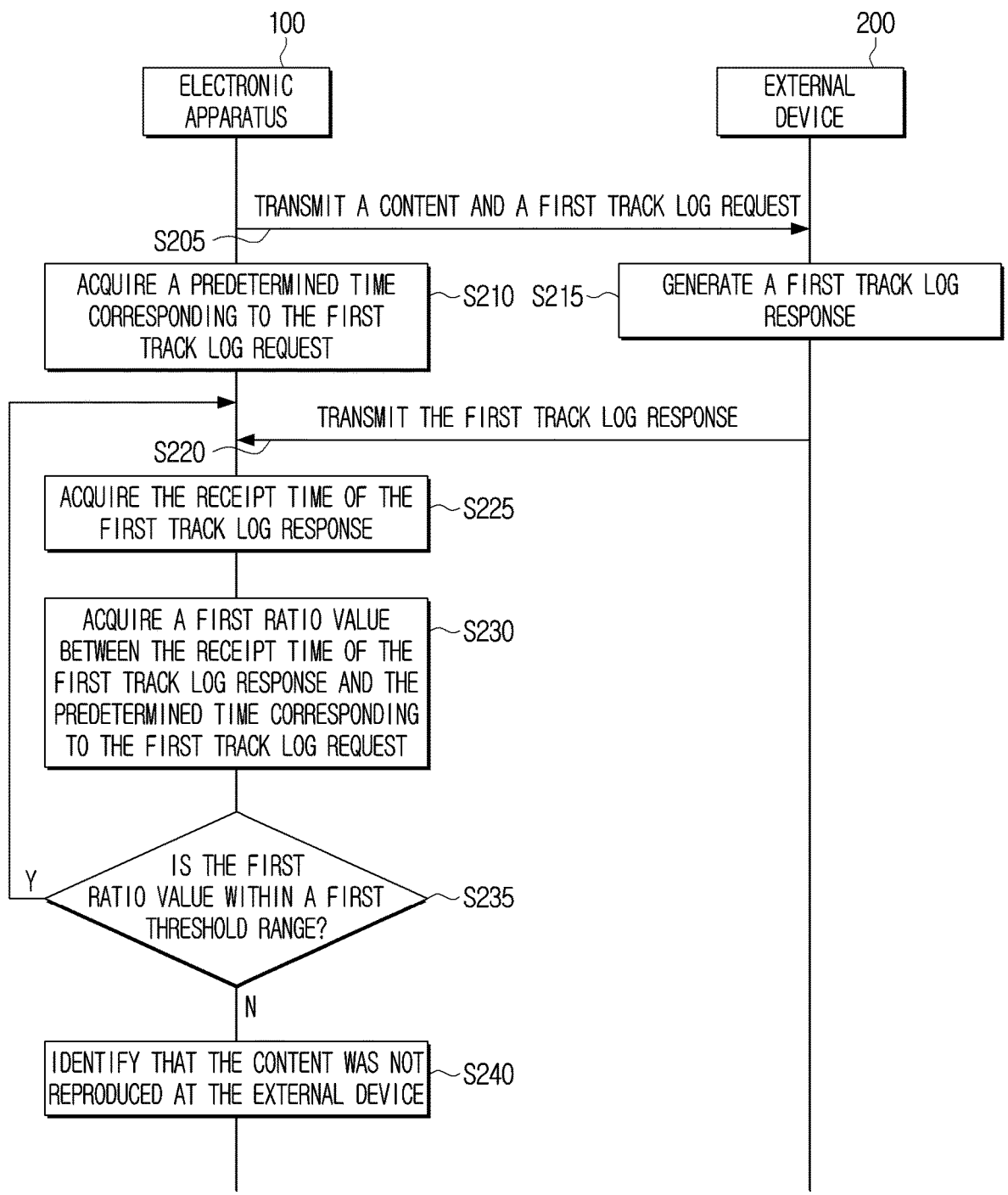
FIG. 2 is a diagram for illustrating a track log request and a track log response according to an embodiment.

FIG. 2 is a diagram for illustrating a track log request and a track log response according to an embodiment.

Referring to FIG. 2, the electronic apparatus 100 may transmit a content and a first track log request to the external device 200 in operation S205. Here, the first track log request may be a request for the external device 200 to transmit a track log for proving reproduction of a content transmitted at a predetermined time. Then, the electronic apparatus 100 may obtain a predetermined time corresponding to the first track log request in operation S210. Here, the predetermined time may indicate a time when a track log response is expected to be transmitted. For example, the predetermined times of a content of 16 seconds may be 0 second (the starting time), 4 seconds, 8 seconds, 12 seconds, and 16 seconds (the ending time).

The external device 200 may generate a first track log response corresponding to the first track log request while reproducing the content in operation S215. Here, the first track log response may be a log that is generated only when a content is reproduced, and it may be a log that cannot be generated (cannot be simulated) when a content is not reproduced. Then, the external device 200 may transmit the generated first track log response to the electronic apparatus 100 in operation S220.

The electronic apparatus 100 may obtain the receipt time of the first track log response based on the first track log response received from the external device 200 in operation S225. Here, the electronic apparatus 100 may receive at least one of an absolute time or a relative time of the first track log response from the external device 200. According to an embodiment, the electronic apparatus 100 may obtain the receipt time as an absolute time (e.g., 2:20:30 p.m. of Dec. 14, 2020). According to another embodiment, the electronic apparatus 100 may obtain the receipt time as a relative time (e.g., a time point when 4 seconds passed after a moving image was reproduced). According to still another embodiment, the electronic apparatus 100 may obtain both of an absolute time and a relative time. As still another example, the electronic apparatus 100 may receive an absolute time and calculate a relative time.

Also, the electronic apparatus 100 may obtain a first ratio value between the receipt time of the first track log response and the predetermined time corresponding to the first track log request in operation S230. Here, the first ratio value may be a value for determining whether the first track log response for the first track log request was received correctly at the predetermined time.

For example, a track log may be requested at 4 seconds after the content was reproduced. If a track log response is received at 3 seconds, but not 4 seconds after the content was reproduced, the electronic apparatus 100 may determine that the track log response of the external device 200 has a difference as much as 1 second. Then, the electronic apparatus 100 may obtain the first ratio value as 3/4.

Also, the electronic apparatus 100 may identify whether the first ratio value is within a first threshold range in operation S235. Here, the first threshold range may indicate a range wherein it is deemed that a track log was received normally at the scheduled time. For example, the first threshold range may be between 0.75 and 1.25.

If the first ratio value is within the first threshold range in operation S235-Y, the electronic apparatus 100 may continuously receive the first track log response from the external device 200 and perform an analyzing operation, thereby repeating the operations S225 to S235. Here, the first track log request may include a plurality of requests.

If the first ratio value is not within the first threshold range in operation S235-N, the electronic apparatus 100 may identify that the content was not reproduced at the external device in operation S240.

For example, a track log may be requested at 4 seconds after the content was reproduced. If a track log response is received at 2 seconds, but not 4 seconds after the content was reproduced, the electronic apparatus 100 may obtain the first ratio value (0.5) and determine that the first ratio value is outside the first threshold range (0.75 to 1.25). Then, the electronic apparatus 100 may identify that the external device 200 that transmitted the first track log response at 2 seconds did not actually reproduce the content.

A threshold value may be used instead of a threshold range in the operation S235. Specifically, the electronic apparatus 100 may determine whether the first ratio value is smaller than a threshold value. Here, the threshold value may be 0.75. If the first ratio value is smaller than 0.75, the electronic apparatus 100 may identify that the content was not reproduced normally at the external device 200. For using a threshold value instead of a threshold range, the electronic apparatus 100 may determine a method of obtaining the first ratio value differently. For example, if the first ratio value is obtained by using the formula 610 in FIG. 6, the electronic apparatus 100 may use a threshold range, and if the first ratio value is obtained by using the formula 620 in FIG. 6, the electronic apparatus 100 may use a threshold value.

Figure 3:
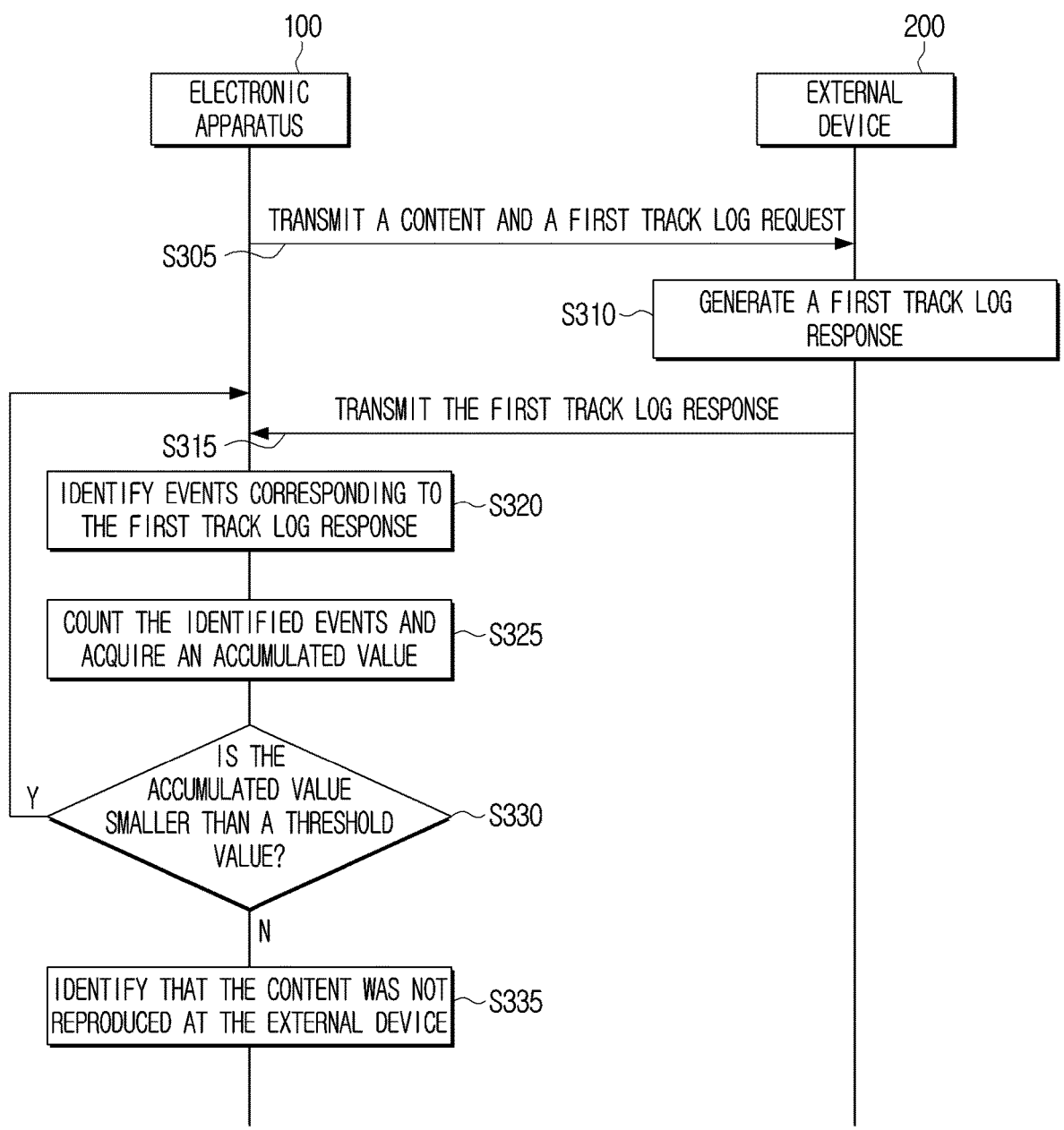
FIG. 3 is a diagram for illustrating a track log request and a track log response according to another embodiment.

FIG. 3 is a diagram for illustrating a track log request and a track log response according to another embodiment.

Referring to FIG. 3, the electronic apparatus 100 may transmit a content and a first track log request to the external device 200 in operation S305. Here, the first track log request may request the external device 200 to transmit a track log when a predetermined event occurs. Here, the predetermined event may indicate an event of receiving a control command of a user. For example, the predetermined event may be reproduction, temporary pause, screen conversion, mute, volume change, etc.

Also, the external device 200 may generate a first track log response corresponding to the first track log request in operation S310. For example, if a user's mute command is received, the external device 200 may obtain the time when the mute command was received and the time when the mute command was executed, and generate a first track log response based on the obtained times. Then, the external device 200 may transmit the first track log response to the electronic apparatus 100 in operation S315.

In addition, the electronic apparatus 100 may identify an event corresponding to the first track log response based on the first track log response received from the external device 200 in operation S315. The electronic apparatus 100 may determine which event the first track log response was generated based on. For example, the electronic apparatus 100 may determine that the first track log response was generated based on a mute event.

Further, the electronic apparatus 100 may count the identified events and obtain an accumulated value in operation S325. Specifically, the electronic apparatus 100 may determine whether a predetermined event occurred and obtain the accumulated number of times for each event. For example, the electronic apparatus 100 may calculate the accumulated number of times of the mute event.

Also, the electronic apparatus 100 may identify whether an accumulated value is smaller than a threshold value in operation S330. Here, if the accumulated value is smaller than the threshold value in operation S330-Y, the electronic apparatus 100 may continuously receive the first track log response from the external device 200.

If the accumulated value is greater than or equal to the threshold value in operation S330-N, the electronic apparatus 100 may identify that the content was not reproduced at the external device 200 in operation S335.

In the aforementioned embodiment, a mute command was suggested as an example, but the disclosure is not necessarily limited thereto. The electronic apparatus 100 may compare accumulated values for a plurality of respective events and threshold values corresponding to the plurality of respective events. Here, the threshold values corresponding to the plurality of respective events may be different from one another. For example, a threshold value corresponding to a mute event may be 2 times, and a threshold value for a screen size change event may be 5 times.

Figure 4:
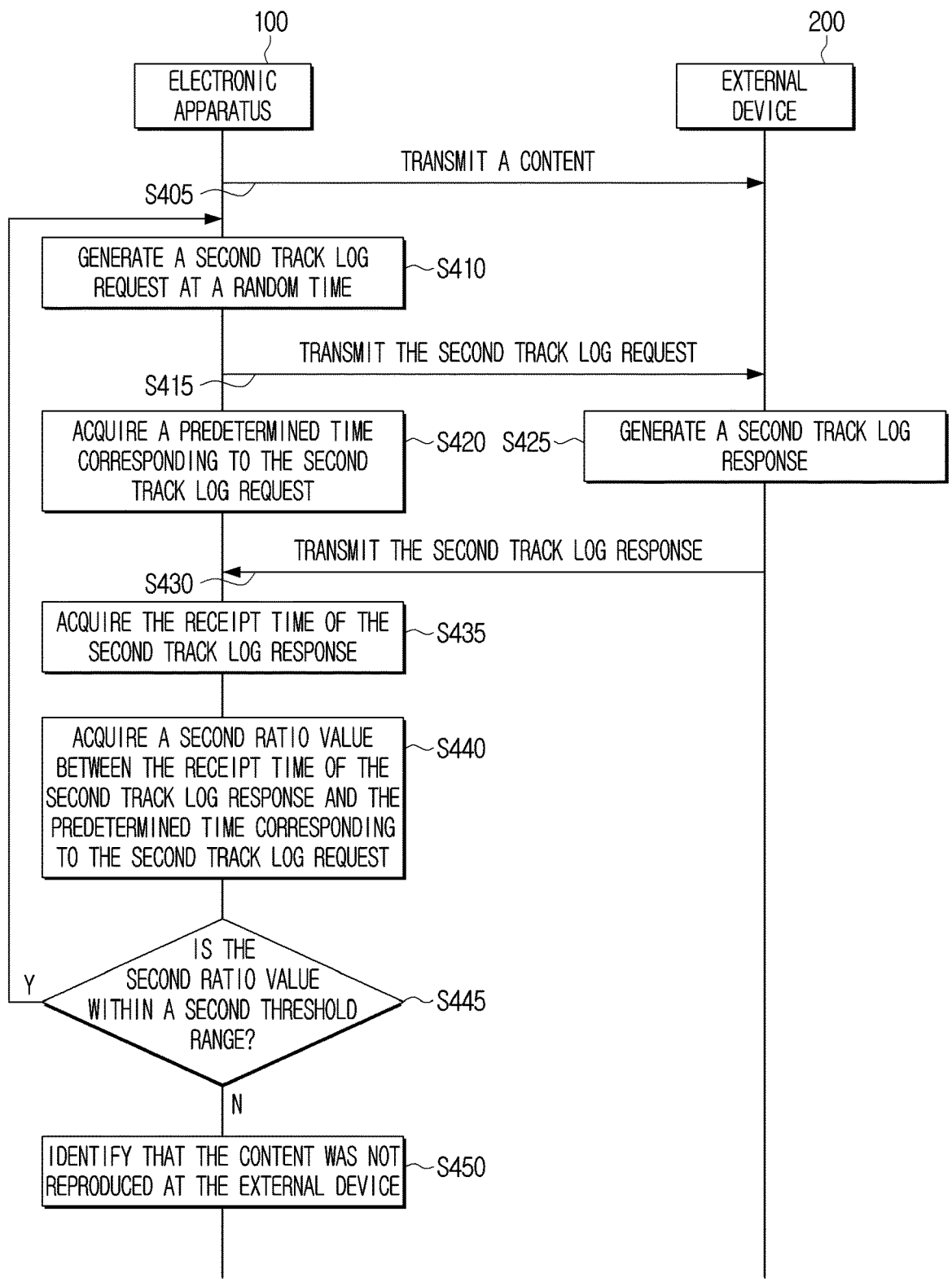
FIG. 4 is a diagram for illustrating a track log request and a track log response according to still another embodiment.

FIG. 4 is a diagram for illustrating a track log request and a track log response according to still another embodiment.

Referring to FIG. 4, the electronic apparatus 100 may transmit a content to the external device 200 in operation S405. Then, the electronic apparatus 100 may generate a second track log request at a random time in operation S410. Here, the second track log request may indicate a request for a track log proving reproduction of a content transmitted for identifying whether the content was reproduced at a random time.

Also, the electronic apparatus 100 may transmit the generated second track request to the external device 200 in operation S415. Then, the electronic apparatus 100 may obtain a predetermined time corresponding to the second track log request in operation S420. Here, the predetermined time may indicate a time period within which a second track log response corresponding to the second track log request should be received from the external device 200. For example, if the second track log request is transmitted to the external device 200 at a random time, the electronic apparatus 100 may request to transmit a second track log response within 3 seconds.

In addition, the external device 200 may generate a second track log response for responding to the second track log request received from the electronic apparatus 100 in operation S425. Specifically, if the second track log request is received at a random time, the electronic apparatus 100 may immediately generate a second track log response including a track log proving that the content is being reproduced. Then, the external device 200 may transmit the generated second track log response to the electronic apparatus 100 in operation S430.

Further, the electronic apparatus 100 may receive the second track log response from the external device 200, and obtain the receipt time of the second track log response in operation S435.

Also, the electronic apparatus 100 may obtain a second ratio value between the receipt time of the second track log response and the predetermined time corresponding to the second track log request. Here, the second ratio value may be a value used in determining how fast a response arrived in response to a request at a random time. For example, the predetermined time corresponding to the second track log request may be 3 seconds. Thus, if the second track log response is received within 3 seconds after the second track log request is transmitted, the electronic apparatus 100 may determine that reproduction of the content is normal. If the second track log response is received at 2 seconds after the second track log request is transmitted, the second ratio value may be 2/3.

In addition, the electronic apparatus 100 may identify whether the second ratio value is within a second threshold range in operation S445. Here, the second threshold range may indicate a range wherein the second track log response arrives normally. The second threshold range may be bigger than the first threshold range in FIG. 2. While the first threshold range in FIG. 2 is related to a request for a response transmitted at a predetermined time, the second threshold range is related to a request for a response transmitted at a random time, delay may be generated between transmission and receipt. Accordingly, the electronic apparatus 100 may set the second threshold range to be wider than the first threshold range. For example, the second threshold range may be 0 to 1. If the second track log response is received from 0 second before the predetermined time after the second track log request is transmitted, the second ratio value may be within the second threshold range.

If the second ratio value is within the second threshold range in operation S445-Y, the electronic apparatus 100 may continuously generate the second track log request. The electronic apparatus 100 may repeat the operations S410 to S445.

If the second ratio value is outside the second threshold range in operation S445-N, the electronic apparatus 100 may identify that the content was not reproduced normally at the external device 200 in operation S450.

In the operation S445, a threshold value may be used instead of a threshold range. Specifically, the electronic apparatus 100 may determine whether the second ratio value is smaller than a threshold value. Here, the threshold value may be 1. If the second ratio value is smaller than 1, the electronic apparatus 100 may identify that the content was not reproduced normally at the external device 200.

In FIG. 4, it was described that the second ratio value is obtained by using the predetermined time corresponding to the second track log request, but this may be omitted in actual implementation. Specifically, the electronic apparatus 100 may only identify whether the second track log response requested at a random time arrived within the predetermined time. Then, if the second track log response arrived within the predetermined time, the electronic apparatus 100 may determine that reproduction of the content at the external device 200 is normal.

Figure 5:
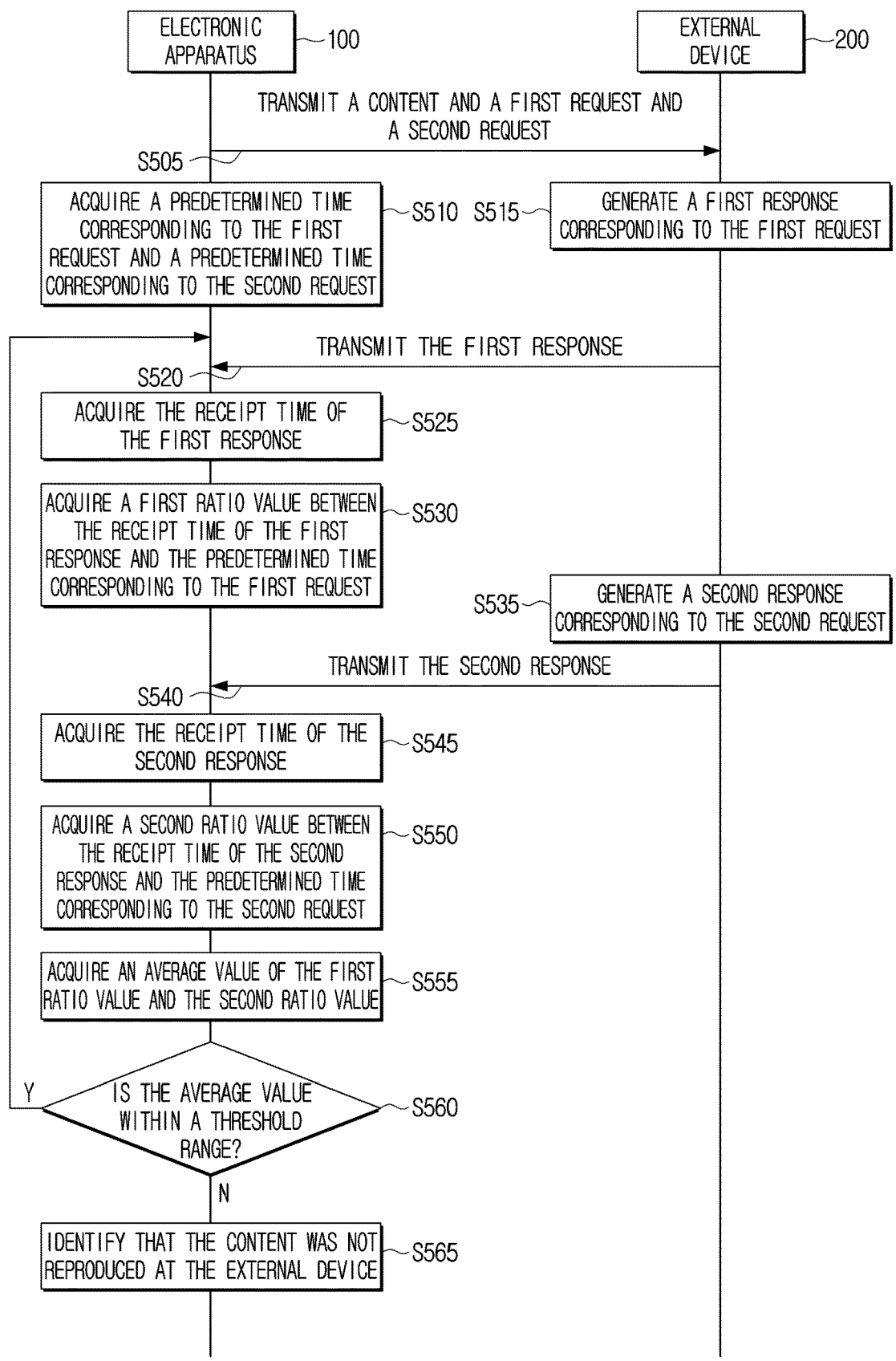
FIG. 5 is a diagram for illustrating a track log request and a track log response according to still another embodiment.

FIG. 5 is a diagram for illustrating a track log request and a track log response according to still another embodiment.

Referring to FIG. 5, the electronic apparatus 100 may transmit a content, and a first request and a second request to the external device 200 in operation S505. Here, the first request and the second request may indicate requests included in the first track log request. The first track log request may include requests for at least two track log responses to be transmitted. For example, the first request may be a request for a response to be transmitted at a time corresponding to the first quartile (4 seconds) in the entire reproduction time of the content (e.g., 16 seconds), and the second request may be a request for a response to be transmitted at a time corresponding to the second quartile (8 seconds) in the entire reproduction time of the content (e.g., 16 seconds).

Also, the electronic apparatus 100 may obtain a predetermined time corresponding to the first request and a predetermined time corresponding to the second request in operation S510. For example, the predetermined time corresponding to the first request may be the time corresponding to the first quartile (4 seconds), and the predetermined time corresponding to the second request may be the time corresponding to the second quartile (8 seconds).

In addition, the external device 200 may generate a first response corresponding to the first request received from the electronic apparatus 100 in operation S515. Here, the first response may include a track log for proving reproduction of the content. Then, the external device 200 may transmit the generated first response to the electronic apparatus 100 in operation S520.

Further, the electronic apparatus 100 may receive the first response from the external device 200, and obtain the receipt time of the first response in operation S525. Then, the electronic apparatus 100 may obtain a first ratio value between the receipt time of the first response and the predetermined time corresponding to the first request in operation S530. For example, if the receipt time of the first response is 3 seconds and the predetermined time corresponding to the first request is 4 seconds, the first ratio value may be 3/4.

Also, the external device 200 may generate a second response corresponding to the second request in operation S535. Here, the second response may include a track log for proving reproduction of the content. Then, the external device 200 may transmit the generated second response to the electronic apparatus 100 in operation S540.

In addition, the electronic apparatus 100 may receive the second response from the external device 200, and obtain the receipt time of the second response in operation S545. Then, the electronic apparatus 100 may obtain a second ratio value between the receipt time of the second response and the predetermined time corresponding to the second request in operation S550. For example, if the receipt time of the second response is 7 seconds and the predetermined time corresponding to the second request is 8 seconds, the first ratio value may be 3/4. Here, for obtaining homogenous ratios, the electronic apparatus 100 may obtain the first ratio value by changing the time based on the quartiles. If the electronic apparatus 100 does not consider the quartiles, the first ratio value may be 7/8.

Also, the electronic apparatus 100 may obtain an average value between the first ratio value and the second ratio value in operation S555. For example, if the first ratio value is 3/4 and the second ratio value is 3/4, the average value may be 3/4.

In addition, the electronic apparatus 100 may identify whether the average value is within a threshold range in operation S560. If the average value is within the threshold range in operation S560-Y, the electronic apparatus 100 may repetitively receive a response from the external device 200. Specifically, the electronic apparatus 100 may receive a plurality of responses from the external device 200.

Further, if the average value is outside the threshold range in operation S560-N, the electronic apparatus 100 may identify that the content was not reproduced at the external device 200 in operation S565.

FIG. 6 is a diagram for illustrating a feature of obtaining a ratio value and an average value according to an embodiment.

Referring to FIG. 6, a first track log request may include a request for a plurality of track logs to be transmitted. Specifically, the first track log request may indicate a request for track logs corresponding to occurrence of a plurality of events transmitted. In case a plurality of events occurred, the external device 200 may transmit a first track log response including track logs that can prove the fact that events occurred. Here, the plurality of events may include events wherein contents are being reproduced at a plurality of predetermined times.

According to timeline 605, the plurality of events may include an event wherein a content is being reproduced at a time corresponding to the first quartile (t_e1) in the total reproduction time of the content, an event wherein a content is being reproduced at a time corresponding to the second quartile (t_e2), an event wherein a content is being reproduced at a time corresponding to the third quartile (t_e3), and an event wherein a content is being reproduced at a time corresponding to the fourth quartile (t_e4).

Here, the content may be 16 seconds in total, the plurality of events may include events wherein the content is being reproduced at 4 seconds, 8 seconds, 12 seconds, and 16 seconds, respectively.

Here, te1, te2, te3, and te4 may be the predetermined times corresponding to the first track log request. Accordingly, if the content is being reproduced normally at the external device 200, the electronic apparatus 100 may expect that the first track log response will be received at each of the te1, te2, te3, and te4 times after the content is reproduced.

The times when the electronic apparatus 100 receives the first track log response corresponding to the first track log request may be ta1, ta2, ta3, and ta4.

According to an embodiment, the electronic apparatus 100 may obtain a first ratio value by using the formula 1 (610).

$$\text{ratio value} = \frac{t\_ax}{t\_ex} \quad \text{[Formula 1]}$$

According to an embodiment, the average value of the first ratio values may be obtained by using the formula 1 (610).

Here, t_ex may indicate the predetermined time corresponding to the first track log request. The predetermined time may indicate the time when an event for the first track log request occurs or the time when an event is expected. Here, t_ax may indicate the time when the first track log response corresponding to the first track log request was received (or generated).

According to an embodiment, the electronic apparatus 100 may obtain the average value of the first ratio values by using the formula 2 (615).

$$\text{average ratio value} = \frac{1}{n}\sum_{x=1}^{n}\frac{t\_ax}{t\_ex} \quad \text{[Formula 2]}$$

Here, n may indicate the total number of events for the first track log request. As t_ex and t_ax are identical to those in the formula 1, overlapping explanation will be omitted.

According to another embodiment, the electronic apparatus 100 may obtain the first ratio value by using the formula 3 (620).

$$\text{ratio value} = \frac{t\_ex - |t\_ex - t\_ax|}{t\_ex} \quad \text{[Formula 3]}$$

Here, as t_ex and t_ax are identical to those in the formula 1, overlapping explanation will be omitted.

In case the electronic apparatus 100 obtains the first ratio value by using the formula 3 (620), the same value may be obtained not only in a case wherein the first track log response is received faster than the expected time but also in a case wherein the first track log response is received later than the expected time.

For example, an embodiment wherein an actual response was received at 3 seconds in case the expected time is 4 seconds and an embodiment wherein an actual response was received at 5 seconds are assumed. If the formula 1 (610) is used, the first ratio value in the embodiment wherein the response was received at 3 seconds may be 3/4, and the first ratio value in the embodiment wherein the response was received at 5 seconds may be 5/4. Here, although the response was received 1 second faster or 1 second later than the expected time of 4 seconds, the first ratio values in the respective embodiments may be different.

However, if the formula 3 (620) is used, the first ratio value in the embodiment wherein the response was received at 3 seconds may be 3/4, and the first ratio value in the embodiment wherein the response was received at 5 seconds may be 3/4. Accordingly, if the formula 3 (620) is used, balanced ratio values may be obtained based on the expected time.

According to another embodiment, the electronic apparatus 100 may obtain the average value of the first ratio values by using the formula 4 (625).

$$\text{average ratio value} = \frac{1}{n}\sum_{x=1}^{n}\frac{t\_ex - |t\_ex - t\_ax|}{t\_ex} \quad \text{[Formula 4]}$$

Here, as t_ex and t_ax are identical to those in the formula 1, and n is identical to that in the formula 2, overlapping explanation will be omitted.

The electronic apparatus 100 may calculate the number of times that the average value of the first ratio values is smaller than a threshold value by using the formula 5 (630).

$$n\_s = \text{count}(\text{average ratio value} < \text{threshold})$$

Here, n_s may indicate the number of times that it was identified that the content was not reproduced normally. Here, count( ) may indicate the function that calculates the number of times. Here, average ratio value may indicate the average value of the first ratio values. Here, threshold may indicate the predetermined threshold value.

The electronic apparatus 100 may request one external device to provide the content a plurality of times. Then, the electronic apparatus 100 may obtain the average value of the first ratio values whenever the content is reproduced. Then, the electronic apparatus 100 may identify whether the average value of the first ratio values is smaller than the threshold value whenever it requests to reproduce the plurality of contents. Then, the electronic apparatus 100 may count the cases wherein the average value of the first ratio values is smaller than the threshold value and store the number as n_s.

The electronic apparatus 100 may obtain reliability of an external device by using the formula 6 (635).

$$\text{Reliability} = 1 - \frac{n\_s}{n\_\text{total}} \quad \text{[Formula 6]}$$

Here, n_s may indicate the number of times that it was identified that the content was not reproduced normally (e.g., the number of times the average value of the first ratio values was smaller than the threshold value). Here, n total may indicate the total number of times that reproduction of the content was requested. Ultimately, reliability may indicate the ratio of the number of times that it was determined that the content was reproduced normally among the number of times of reproduction of the content performed at an external device. For example, if it is determined that the content was reproduced abnormally 4 times among 10 times of requests to reproduce the content, the reliability may be 0.6.

Figure 7:
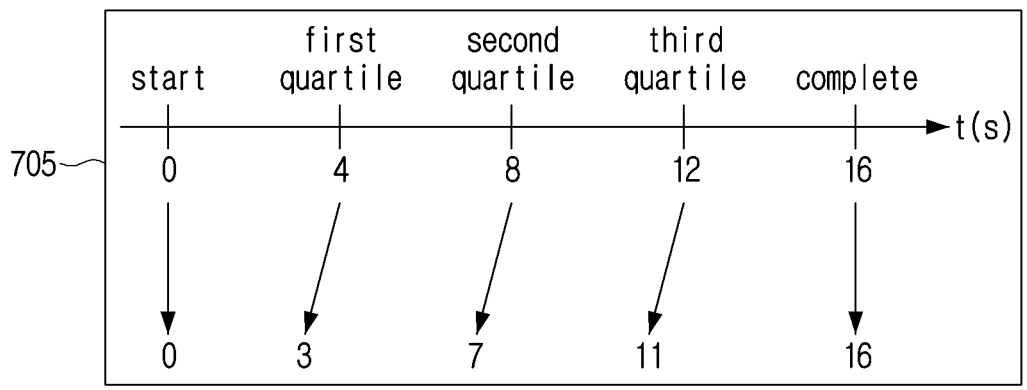
FIG. 7 is a diagram for illustrating a feature of obtaining a ratio value and an average value according to another embodiment.

FIG. 7 is a diagram for illustrating a feature of obtaining a ratio value and an average value according to another embodiment.

Referring to timeline 705 in FIG. 7, the plurality of events may include a reproduction event of the first quartile, a reproduction event of the second quartile, a reproduction event of the third quartile, and a reproduction event of the fourth quartile. Then, the predetermined times corresponding to the first track log request may be 4 seconds, 8 seconds, 12 seconds, and 16 seconds, and the times when the first track log response was received actually received may be 3 seconds, 7 seconds, 11 seconds, and 16 seconds.

Here, depending on whether the time when the first track log response was received will be calculated as a relative time or an absolute time, the average value of the first ratio values may be different.

According to an embodiment, the electronic apparatus 100 may obtain the first ratio value by using the time when the first track log response was received as a relative time. The standard of the relative time may be a unit time. Here, the unit time may indicate the time interval of distinguishing reproduction events.

For example, if a content of 16 seconds is divided into quartiles, the unit time may be 4 seconds. Then, the electronic apparatus 100 may determine when a response was received based on the unit time 4 seconds.

Referring to the calculating process 710, a response corresponding to the reproduction event of the first quartile was received at 3 seconds based on the unit time 4 seconds. Then, a response corresponding to the reproduction event of the second quartile was received at 3 seconds based on the unit time 4 seconds. Then, a response corresponding to the reproduction event of the third quartile was received at 3 seconds based on the unit time 4 seconds. Accordingly, all of the first ratio values corresponding to the reproduction events of the first to third quartiles may be 3/4.

A response corresponding to the reproduction event of the fourth quartile was received at 4 seconds based on the unit time 4 seconds. Accordingly, the first ratio value corresponding to the reproduction event of the fourth quartile may be 4/4.

Also, the average value of the first ratio values calculated by using the relative time may be 0.81 (rounded off in the third decimal place).

According to another embodiment, the electronic apparatus 100 may obtain the first ratio value by using the time when the first track log response was received as an absolute time.

Referring to the calculating process 715, a response corresponding to the reproduction event of the first quartile was received at 3 seconds. Then, a response corresponding to the reproduction event of the second quartile was received at 7 seconds. Then, a response corresponding to the reproduction event of the third quartile was received at 11 seconds. Then, a response corresponding to the reproduction event of the fourth quartile was received at 16 seconds. Accordingly, the first ratio value corresponding to the reproduction event of the first quartile may be 3/4, the first ratio value corresponding to the reproduction event of the second quartile may be 7/8, the first ratio value corresponding to the reproduction event of the third quartile may be 11/12, and the first ratio value corresponding to the reproduction event of the fourth quartile may be 16/16.

Also, the average value of the first ratio values calculated by using the absolute time may be 0.89 (rounded off in the third decimal place).

In the case of calculating the first ratio value by using the relative time, a weight value may be applied to each event homogeneously, and in the case of calculating the first ratio value by using the absolute time, a weight value for an event that occurs in the initial period of reproduction of the content may be reflected to be high. For example, in the case of using the absolute time, the first track log response was received 1 second faster than the expected time in the same manner, but the first ratio value corresponding to the reproduction event of the third quartile may be 11/12 which is close to 1. Accordingly, in the case of using the absolute time, the same effect as in setting a weight value in the later part of reproduction of the content to be low may be exerted.

In the embodiments below, calculation will be performed by using a relative time, for the convenience of explanation.

Figure 8:
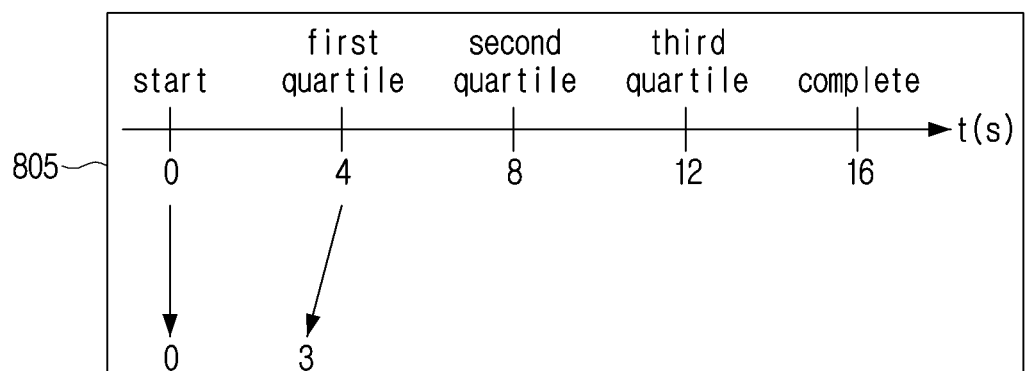
FIG. 8 is a diagram for illustrating a feature of obtaining a ratio value and an average value according to still another embodiment.

FIG. 8 is a diagram for illustrating a feature of obtaining a ratio value and an average value according to still another embodiment.

Referring to timeline 805 in FIG. 8, the plurality of events include a reproduction event of the first quartile, a reproduction event of the second quartile, a reproduction event of the third quartile, and a reproduction event of the fourth quartile. Then, the predetermined times corresponding to the first track log request may be 4 seconds, 8 seconds, 12 seconds, and 16 seconds, and the only time when the first track log response was received may be 3 seconds. That is, only a response corresponding to the reproduction event of the first quartile may be received, and other responses may not be received. The timeline 805 may be an embodiment wherein a content was provided only between 4 seconds and 8 seconds. For example, the timeline 805 may be a situation wherein a content provided by an external device to consumers was stopped in the middle.

Referring to the calculating process 810, if the expected time of the reproduction event of the first quartile is 4 seconds, and a response corresponding to the first quartile is received at 3 seconds, the first ratio value may be 3/4, and the average value of the first ratio values may also be 3/4.

Figure 9:
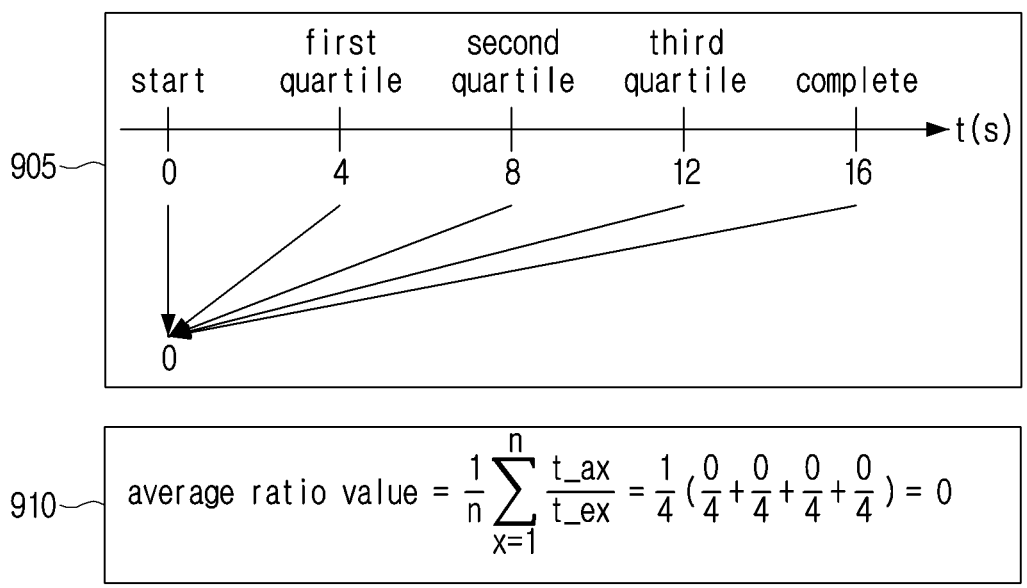
FIG. 9 is a diagram for illustrating a feature of obtaining a ratio value and an average value according to still another embodiment.

FIG. 9 is a diagram for illustrating a feature of obtaining a ratio value and an average value according to still another embodiment.

Referring to timeline 905 in FIG. 9, the plurality of events include a reproduction event of the first quartile, a reproduction event of the second quartile, a reproduction event of the third quartile, and a reproduction event of the fourth quartile. Then, the predetermined times corresponding to the first track log request may be 4 seconds, 8 seconds, 12 seconds, and 16 seconds, and all the times when the first track log response was received are 0 second. That is, all of the four responses corresponding to the reproduction event of the first quartile to the reproduction event of the fourth quartile may be received at 0 seconds. For example, timeline 905 may indicate a situation wherein a content is being reproduced abnormally, and abnormal reproduction may be suspected.

Referring to the calculating process 910, the first ratio values corresponding to the reproduction event of the first quartile to the reproduction event of the fourth quartile may be 0, and the average value of the first ratio values may also be 0.

Figure 10:
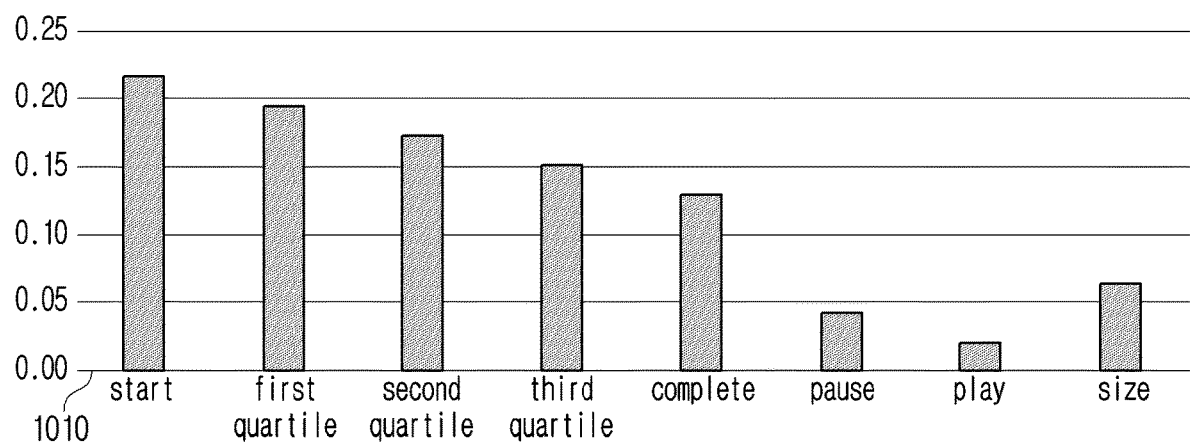
FIG. 10 is a diagram for illustrating distribution rates of a plurality of respective events that occurred at an external device according to an embodiment.

FIG. 10 is a diagram for illustrating distribution rates of a plurality of respective events that occurred at an external device.

Referring to FIG. 10, the plurality of events may include at least one of a start, a reproduction event of the first quartile, a reproduction event of the second quartile, a reproduction event of the third quartile, a reproduction event of the fourth quartile (a reproduction completion event), a temporary pause event (a temporary pause selection event), a general reproduction event (a reproduction button selection event), or a screen size change event.

Referring to the table 1005, the electronic apparatus 100 may obtain the number of times that the plurality of events occurred and the distribution rates (i.e., ratio) of the plurality of respective events.

Referring to the graph 1010, the distribution rates of the start, the reproduction event of the first quartile, the reproduction event of the second quartile, the reproduction event of the third quartile, and the reproduction event of the fourth quartile may become gradually lower. For example, from among these events the distribution rate of the start may be highest, and the distribution rate of the fourth quartile (a reproduction completion event) be lowest. This is because a case wherein, as a content starts, it may be stopped before it is completed. In general, all consumers view the first part of a content, but some consumers stop viewing the content in the middle, and thus the distribution rates the reproduction event of the first quartile, the reproduction event of the second quartile, the reproduction event of the third quartile, and the reproduction event of the fourth quartile may become gradually lower.

The electronic apparatus 100 may determine abnormal reproduction of the content based on distribution rates of the respective events. As an example, if the distribution rates of the reproduction event of the first quartile, the reproduction event of the second quartile, the reproduction event of the third quartile, and the reproduction event of the fourth quartile do not become gradually lower, the electronic apparatus 100 may determine that the external device 200 is not reproducing the content normally.

As another example, if the distribution rate of a screen size change event is greater than or equal to the threshold value, the electronic apparatus 100 may determine that the external device 200 is not reproducing the content normally. This is because, in case a content is reproduced illegally, the screen size may be frequently changed. Here, the change event of the screen size may be divided in detail. Specifically, if the distribution rate of an event of changing to a specific screen size is greater than or equal to the threshold value, the electronic apparatus 100 may determine that the external device 200 is not reproducing the content normally.

Figure 11:
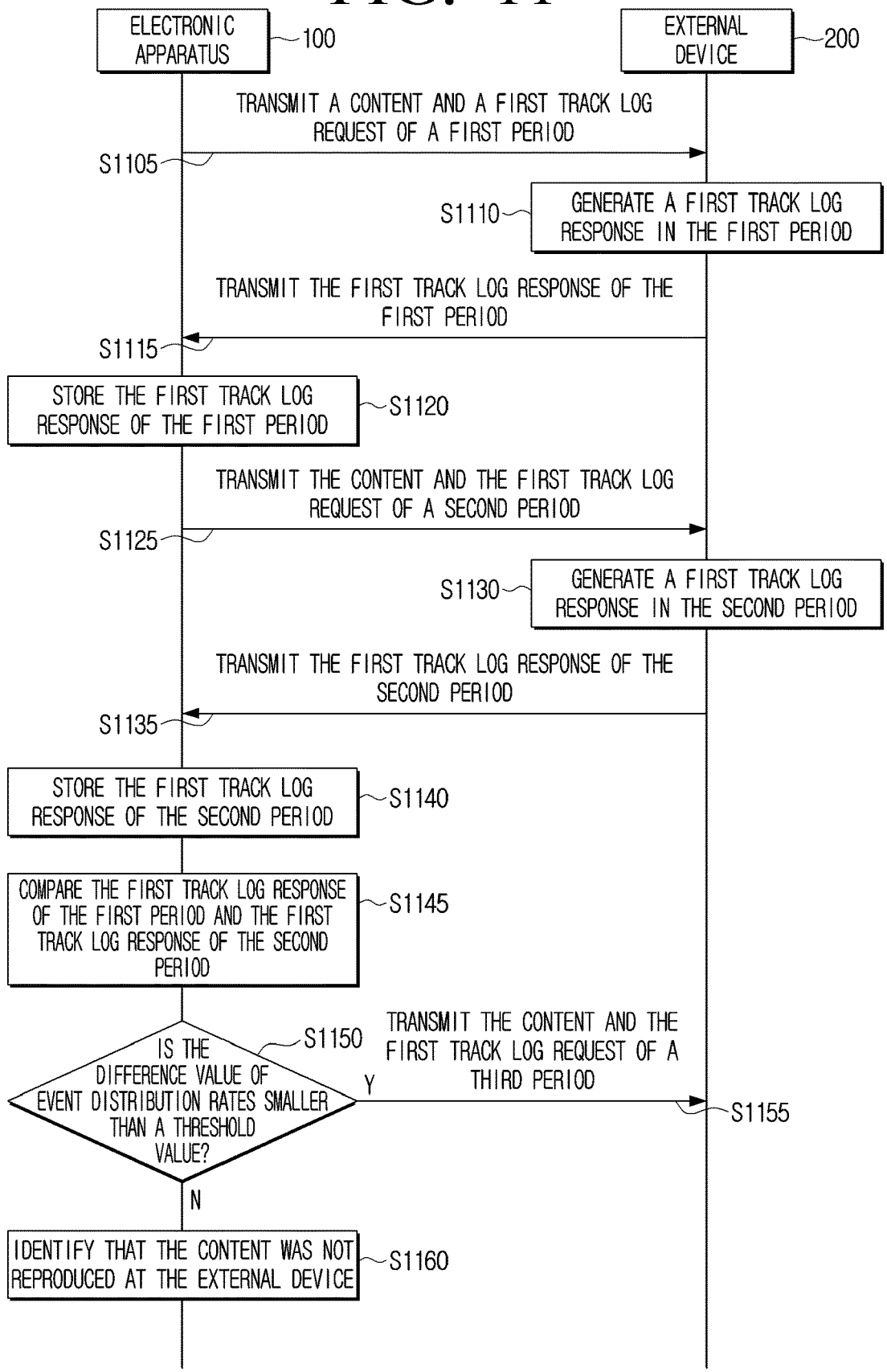
FIG. 11 is a diagram for illustrating an operation of analyzing track log responses received in different periods according to an embodiment.

FIG. 11 is a diagram for illustrating an operation of analyzing track log responses received in different periods.

Referring to FIG. 11, the electronic apparatus 100 may transmit a content and a first track log request of a first period to the external device 200 in operation S1105. Here, the first period may indicate a predetermined time interval. For example, the first period may be a week. The electronic apparatus 100 may request the external device 200 to transmit responses for events that occur during a week.

The external device 200 may generate a first track log response in the first period in operation S1110. Then, the external device 200 may transmit the first track log response generated in the first period to the electronic apparatus 100 in operation S1115.

The electronic apparatus 100 may store the first track log response of the first period received from the external device 200 in operation S1120. Then, the electronic apparatus 100 may transmit the content and the first track log request of a second period to the external device 200 in operation S1125.

Then, the external device 200 may generate the first track log response in the second period in operation S1130. Then, the external device 200 may transmit the first track log response generated in the second period to the electronic apparatus 100 in operation S1135.

The electronic apparatus 100 may store the first track log response of the second period received from the external device 200 in operation S1140. Then, the electronic apparatus 100 may compare the first track log response of the first period and the first track log response of the second period in operation S1145.

Specifically, the electronic apparatus 100 may analyze the first track log response received in the first period and obtain the distribution rate for events that occurred in the first period. Then, the electronic apparatus 100 may analyze the first track log response received in the second period and obtain the distribution rate for events that occurred in the second period. Then, the electronic apparatus 100 may obtain a difference value of the distribution rates of the respective periods based on the distribution rate for the events that occurred in the first period event and the distribution rate for events that occurred in the second period. For example, the electronic apparatus 100 may identify how much different the distribution rates corresponding to a reproduction event of the first quartile are between the first period and the second period.

The electronic apparatus 100 may obtain difference values of the distribution rates for the plurality of respective events. Then, the electronic apparatus 100 may identify whether a difference value of at least one event distribution rate among the difference values of the plurality of event distribution rates is smaller than a threshold value in operation S1150. Here, if the difference value of at least one event distribution rate is smaller than the threshold value in operation S1150-Y, the electronic apparatus 100 may transmit the content and the first track log request of a third period to the external device 200 in operation S1155. Then, the electronic apparatus 100 may receive the first track log response of the third period and compare the distribution rates of the respective events of the second period and the third period.

If the difference value of at least one event distribution rate is greater than or equal to the threshold value in operation S1150-N, the electronic apparatus 100 may identify that the content was not reproduced at the external device 200, and may cease transmission of the content to the external device 200 in operation S1160.

Figure 12:
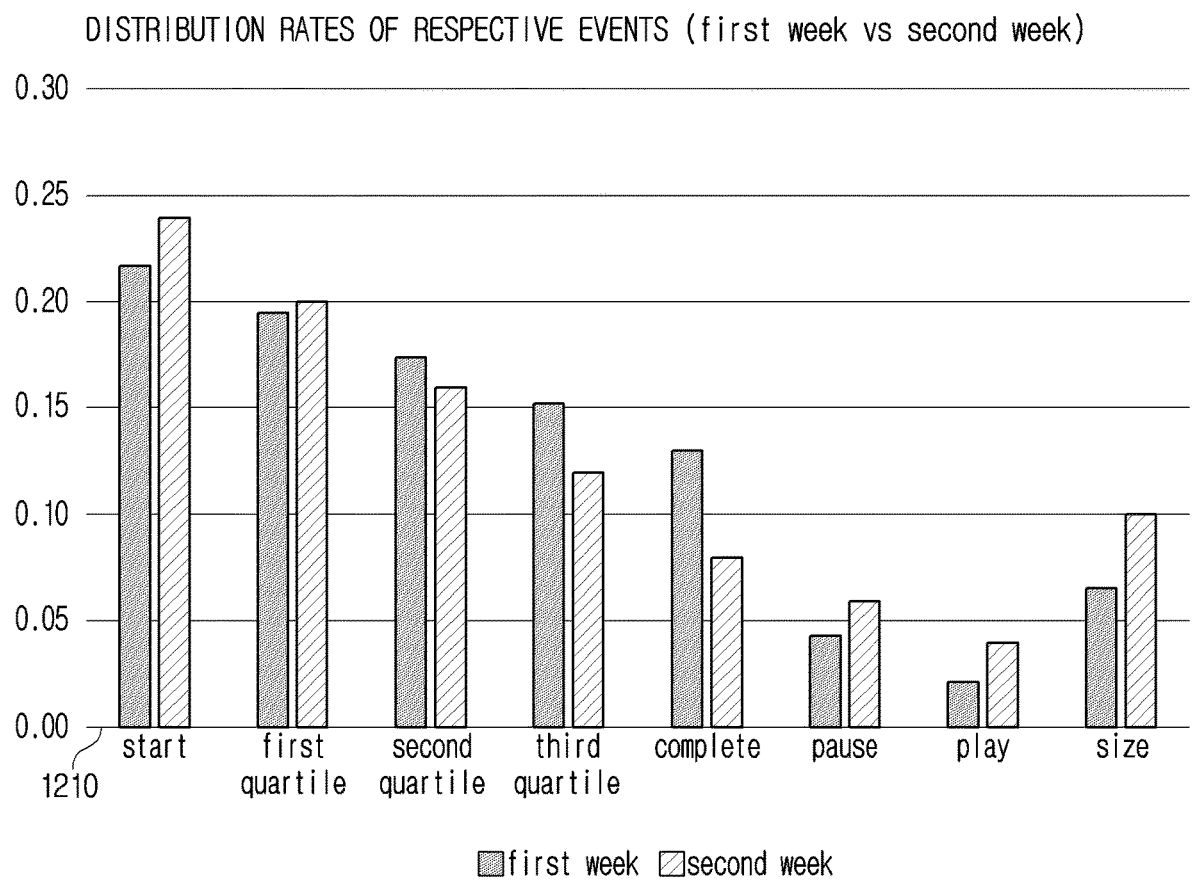
FIG. 12 is a diagram for illustrating distribution rates of respective events of track log responses received in different periods according to an embodiment.

FIG. 12 is a diagram for illustrating distribution rates of respective events of track log responses received in different periods.

Referring to the table 1205 in FIG. 12, the electronic apparatus 100 may obtain distribution rates of a plurality of respective events in the first period (e.g., the first week) and the second period (e.g., the second week).

Referring to the graph 1210 in FIG. 12, the electronic apparatus 100 may compare the distribution rates of respective events in the first period and the second period, and obtain difference values of the distribution rates of the respective events between the first period and the second period. The distribution rates of some events may be increased compared to the first period, and the distribution rates of other events may be decreased compared to the first period.

Figure 13:
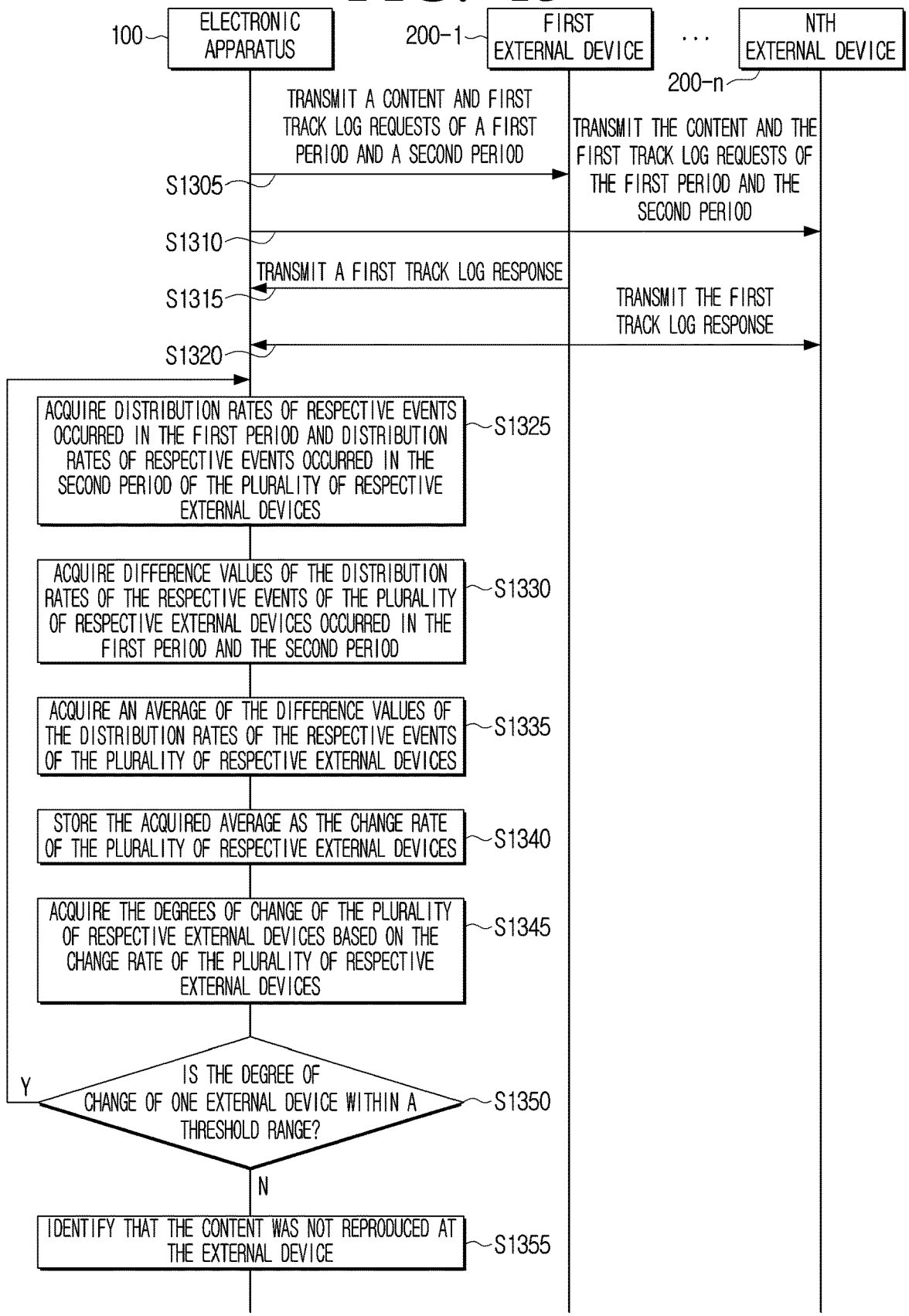
FIG. 13 is a diagram for illustrating receiving track log responses from a plurality of external devices according to an embodiment.

FIG. 13 is a diagram for illustrating receiving track log responses from a plurality of external devices according to an embodiment.

Referring to FIG. 13, the electronic apparatus 100 may transmit a content and first track log requests of specific periods to the first external device 200-1 in operation S1305. Then, the electronic apparatus 100 may transmit the content and the first track log requests of the specific periods to the nth external device 200-*n* in operation S1310. Here, the specific periods may indicate two adjacent periods, which may include the first period and the second period. Accordingly, the electronic apparatus 100 may request the plurality of external devices 200-1 to 200-*n* to transmit the first track log response generated during the first period and the first track log response generated during the second period.

Also, the first external device 200-1 may generate the first track log response, and transmit the generated first track log response to the electronic apparatus 100 in operation S1315. Then, the nth external device 200-n may generate the first track log response, and transmit the generated first track log response to the electronic apparatus 100 in operation S1320.

The electronic apparatus 100 may receive the plurality of first track log responses from the first external device 200-1 to the nth external device 200-n.

The electronic apparatus 100 may obtain distribution rates of the respective events of the plurality of respective external devices 200-1 to 200-n. Specifically, the electronic apparatus 100 may obtain a first distribution rate for the respective events occurred during the first period and a second distribution rate for the respective events occurred during the second period for the plurality of respective external devices 200-1 to 200-n in operation S1325.

Also, the electronic apparatus 100 may obtain difference values of the distribution rates of the respective events of the plurality of respective external devices occurred in the first period and the second period in operation S1330. For example, the electronic apparatus 100 may obtain difference values of the distribution rates of the respective events occurred in the first period and the second period for every event. For example, referring to the table 1205 in FIG. 12, if it is identified that the distribution rate of the start event in the first period is 0.22 and the distribution rate of the start event in the second period is 0.24, the electronic apparatus 100 may obtain the difference value of the distribution rates of the start event as 0.02. Similarly, the electronic apparatus 100 may obtain difference values of distribution rates for each of the other events.

In addition, the electronic apparatus 100 may obtain an average of the difference values of the distribution rates of the respective events of the plurality of respective external devices based on the difference values of the distribution rates of the respective events of the plurality of respective external devices occurred in the first period and the second period in operation S1335. Here, the average of the difference values of the distribution rates of the respective events of the plurality of respective external devices may indicate an average of the difference values of the distribution rates for all events. Referring to the table 1205 in FIG. 12, an average value may be calculated for the difference values of the distribution rates of eight events, and the average value may be 0.0225. Depending on embodiments, the electronic apparatus 100 may obtain an average value of difference values of distribution rates obtained for every event. Here, the electronic apparatus 100 may apply different weight values for each event based on the importance of the event.

Further, the electronic apparatus 100 may store the average (or the average value) obtained in the operation S1335 as the change rate of the plurality of respective external devices in operation S1340. Ultimately, the average obtained in the operation S1335 may indicate how much the event distribution of the external devices changed in the first period and the second period. Accordingly, the average (or the average value) obtained in the operation S1335 may be described as the change rate.

Also, the electronic apparatus 100 may obtain the degrees of change of the plurality of respective external devices in operation S1345 based on the change rates of the plurality of respective external devices obtained in the operation S1340. Here, the degree of change may refer to distribution information indicating how much degree of change the change rate of one external device has in the distribution of the change rates of all of the plurality of external devices. Specifically, the degree of change may include the degree indicating whether the change rate of one external device was changed relatively a lot or a little when the change rates of all external devices are considered.

In addition, the electronic apparatus 100 may determine whether the degrees of change of the plurality of respective external devices are within a threshold range in operation S1350. Then, if the degrees of change are within the threshold range in operation S1350-Y, the electronic apparatus 100 may receive the first track log responses from the plurality of external devices and repeat the operations S1305 to S1350. If the degrees of change are outside the threshold range in operation S1350-N, the electronic apparatus 100 may identify that the content was not reproduced normally at the external devices having the degrees of change outside the threshold range in operation S1355.

In the embodiment of FIG. 13, a process of using an average of difference values of distribution rates of respective events for obtaining the degrees of change of the plurality of respective external devices was described. Here, for obtaining the degrees of change of the plurality of respective external devices, a separate distribution function may be used. A process of obtaining the degrees of change by using a separate distribution function will be described below in FIG. 14.

Figure 14:
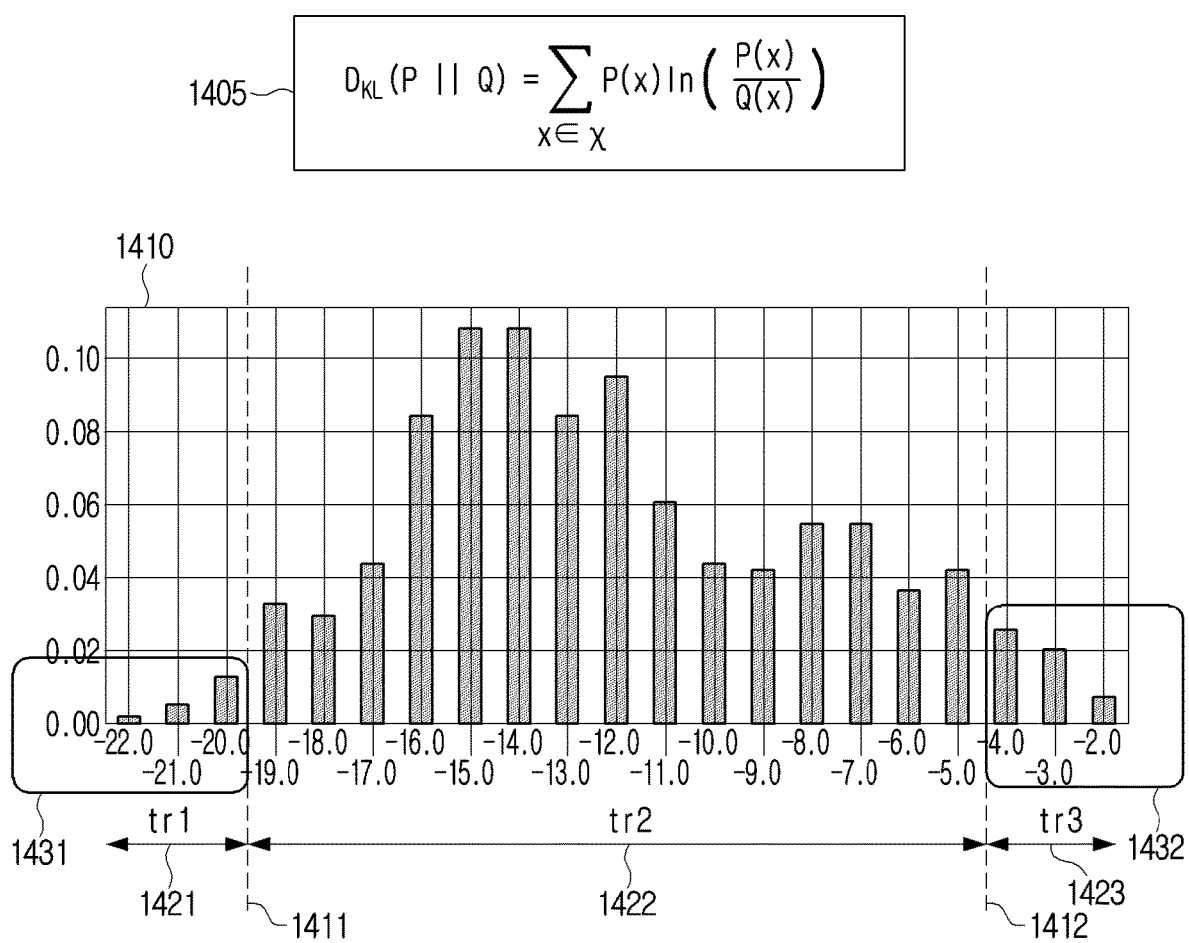
FIG. 14 is a diagram for illustrating an operation of analyzing track log responses received from a plurality of external devices according to an embodiment.

FIG. 14 is a diagram for illustrating an operation of analyzing track log responses received from a plurality of external devices.

Referring to FIG. 14, the electronic apparatus 100 may obtain the degrees of change of the plurality of respective external devices. Specifically, the electronic apparatus 100 may obtain the degrees of change of the plurality of respective external devices by using Kullback-Leibler divergence (KL divergence, KLD).

The formula 1405 may indicate a function corresponding to Kullback-Leibler divergence. Here, the formula 1405 may be a formula corresponding to a discrete probability variable. Here, D_KL may indicate a degree of change obtained by using Kullback-Leibler divergence. Here, P(x) and Q(x) may indicate probability distribution for two probability variables.

P(x) may indicate an event distribution rate for the first period, and Q(x) may indicate an event distribution rate for the second period. Here, x may indicate a variable distinguishing event, and X may indicate the total number of events.

For example, referring to the table 1205 in FIG. 12, the total number of events may be 8, and x1=start, x2=first quartile, x3=second quartile, x4=third quartile, x5=complete, x6=pause, x7=play, x8=size.

For example, P(x) may indicate an event distribution rate for the first period (first week), and P(x1)=0.22, P(x2)=0.20, P(x3)=0.17, P(x4)=0.15, P(x5)=0.13, P(x6)=0.04, P(x7)=0.02, P(x8)=0.07.

For example, Q(x) may indicate an event distribution rate for the second period (second week), and Q(x1)=0.24, Q(x2)=0.20, Q(x3)=0.16, Q(x4)=0.12, Q(x5)=0.08, Q(x6)=0.06, Q(x7)=0.04, Q(x8)=0.10.

Here, X may refer to the 8 events in total (x1 to x8).

The electronic apparatus 100 may obtain a degree of change corresponding to an external device by using the formula 1405.

In the embodiment of FIG. 13, difference values of distribution rates for the first period and the second period, and an average of the difference values were calculated through the operations S1330 and S1335, but in the embodiment of FIG. 14, a Kullback-Leibler divergence (KL divergence, KLD) function may immediately be used for obtaining a degree of change. D_KL may indicate a degree of change.

Here, if log values are applied to the degrees of change of the plurality of respective external devices, the graph 1410 may be obtained. The graph 1410 reflected the log values, but depending on embodiments, a comparing operation for the plurality of external devices may be performed while the log values are not reflected. Referring to the graph 1410, if log values are applied to the degrees of change, values between −22 and −2 may be obtained.

Here, the graph 1410 indicates the distribution rates of the degrees of change of the plurality of respective external devices. Referring to the graph 1410, the distribution of the degrees of change may be divided into three sections. The distribution of the degrees of change may be divided into a first section (tr1, 1421) wherein the degree of change is smaller than the first threshold value (1411), a second section (tr2, 1422) wherein the degree of change is greater than or equal to the first threshold value (1411) and smaller than the second threshold value (1412), and a third section (tr3, 1423) wherein the degree of change is greater than or equal to the second threshold value (1412).

The electronic apparatus 100 may identify that an external device included in the group 1431 having degrees of change corresponding to the first section (tr1, 1421) has a small degree of change of event distribution. Also, the electronic apparatus 100 may identify that an external device included in a group having degrees of change corresponding to the second section (tr2, 1422) has a general degree of change of event distribution. Further, the electronic apparatus 100 may identify that an external device included in the group 1432 having degrees of change corresponding to the third section (tr3, 1423) has a substantial degree of change of event distribution.

The electronic apparatus 100 may identify that the external devices corresponding to the group 1431 and the group 1432 are not reproducing the content normally. Specifically, if a degree of change is smaller than the first threshold value (1411) or greater than or equal to the second threshold value (1412), the electronic apparatus 100 may identify that the external device 200 is not reproducing the content normally.

FIG. 15 is a diagram for illustrating distribution rates of respective events at different times of some external devices.

The graph 1505 in FIG. 15 indicates the distribution rates of the respective events of the external devices included in the group 1431 having degrees of change corresponding to the first section (tr1, 1421) in FIG. 14. The distribution rates of the respective events of the external devices having degrees of change corresponding to the first section (tr1, 1421) may be similar in both of the first period and the second period. If the distribution rates of the respective events in the first period and the second period are too similar, the electronic apparatus 100 may identify that the situation is a situation of abnormal reproduction.

The graph 1510 in FIG. 15 indicates the distribution rates of the respective events of the external devices included in the group 1432 having degrees of change corresponding to the third section (tr3, 1423) in FIG. 14. The distribution rates of the respective events of the external devices having degrees of change corresponding to the third section (tr3, 1423) may be different in the first period and the second period. For example, although a screen size change event 1511 was not recognized in the first period, screen size change events 1511 are recognized in the second period.

Accordingly, the degrees of change of the external devices corresponding to the graph 1510 may be formed to be high. If the distribution rates of the respective events in the first period and the second period are too different, the electronic apparatus 100 may identify that the situation is a situation of abnormal reproduction.

Figure 16:
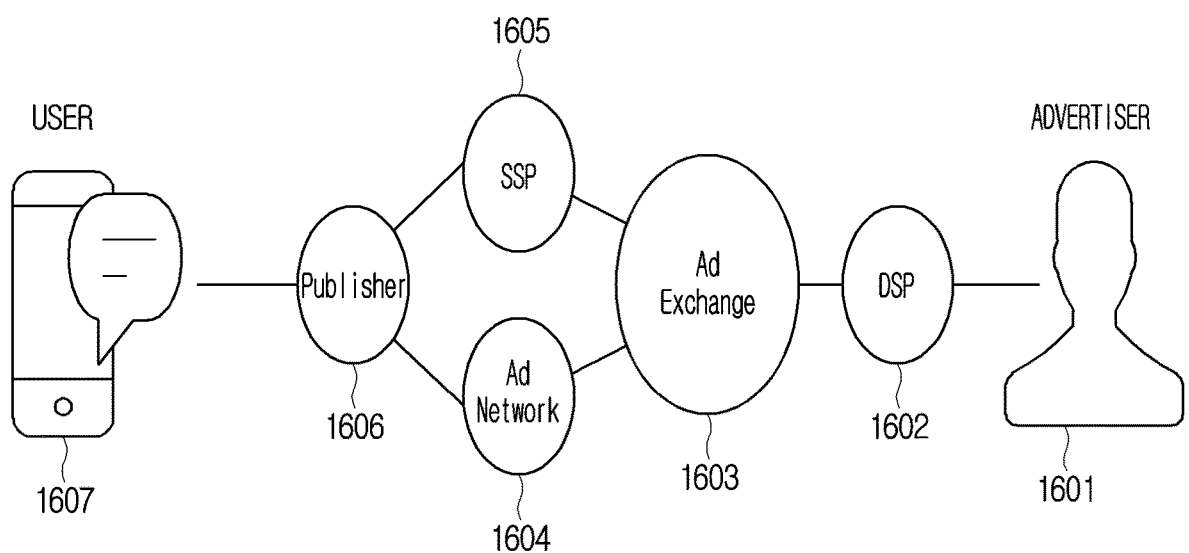
FIG. 16 is a diagram for illustrating a process of providing a content on-line according to an embodiment.

FIG. 16 is a diagram for illustrating a process of providing a content on-line.

Referring to FIG. 16, an advertiser may provide an advertisement to consumers by using an AD-Tech. The AD-Tech may indicate a technology of connecting an advertiser and consumers by using digital big data.

The advertiser 1601 may provide one or more advertisements to consumers. The advertiser may provide an advertisement through a publisher, and pay an advertising cost to the publisher that provided the advertisement. Specifically, the advertiser 1601 may entrust an advertisement (or an advertising content) to a demand side platform (DSP) 1602.

The DSP 1602 may be an advertising site purchase platform. Specifically, the demand side platform 1602 may select a publisher that will expose an advertisement on behalf of the advertiser.

An ad exchange 1603 may indicate an ad network platform that performs advertising mediation. The ad exchange 1603 may be connected with a plurality of ad networks. Also, the ad exchange 1603 may mediate an advertising trade through an auction between the demand side platform 1602 and a supply side platform 1605. The ad exchange 1603 may be interlocked with an ad network 1604, and at the same time, it may connect between the demand side platform 1602 and the supply side platform 1605.

The ad network 1604 may indicate a network that connects a plurality of publishers. It may be inconvenient for the advertiser 1601 to be connected with publishers one by one. The ad network 1604 may be provided to the advertiser 1601, and the advertiser 1601 may expose an advertisement to a plurality of publishers by the unit of the ad network 1604.

The supply side platform (SSP) 1605 may indicate a platform that performs a function of connecting the advertiser 1601 who brings a high profit to a publisher 1606 according to an advertising request of the publisher 1606. Here, the supply side platform 1605 may connect to an ad exchange 1603 and identify an advertiser suitable for the publisher 1606 among a plurality of advertisers.

The publisher 1606 may indicate a program or an apparatus that exposes an advertisement. Here, the publisher 1606 may collect a specific advertisement from the advertiser 1601 by a designated schedule or clicks, etc. from consumers, and provide the collected specific advertisement to the consumers 1607.

The consumers 1607 may view the advertisement of the advertiser 1601 through the publisher 1606.

Figure 17:
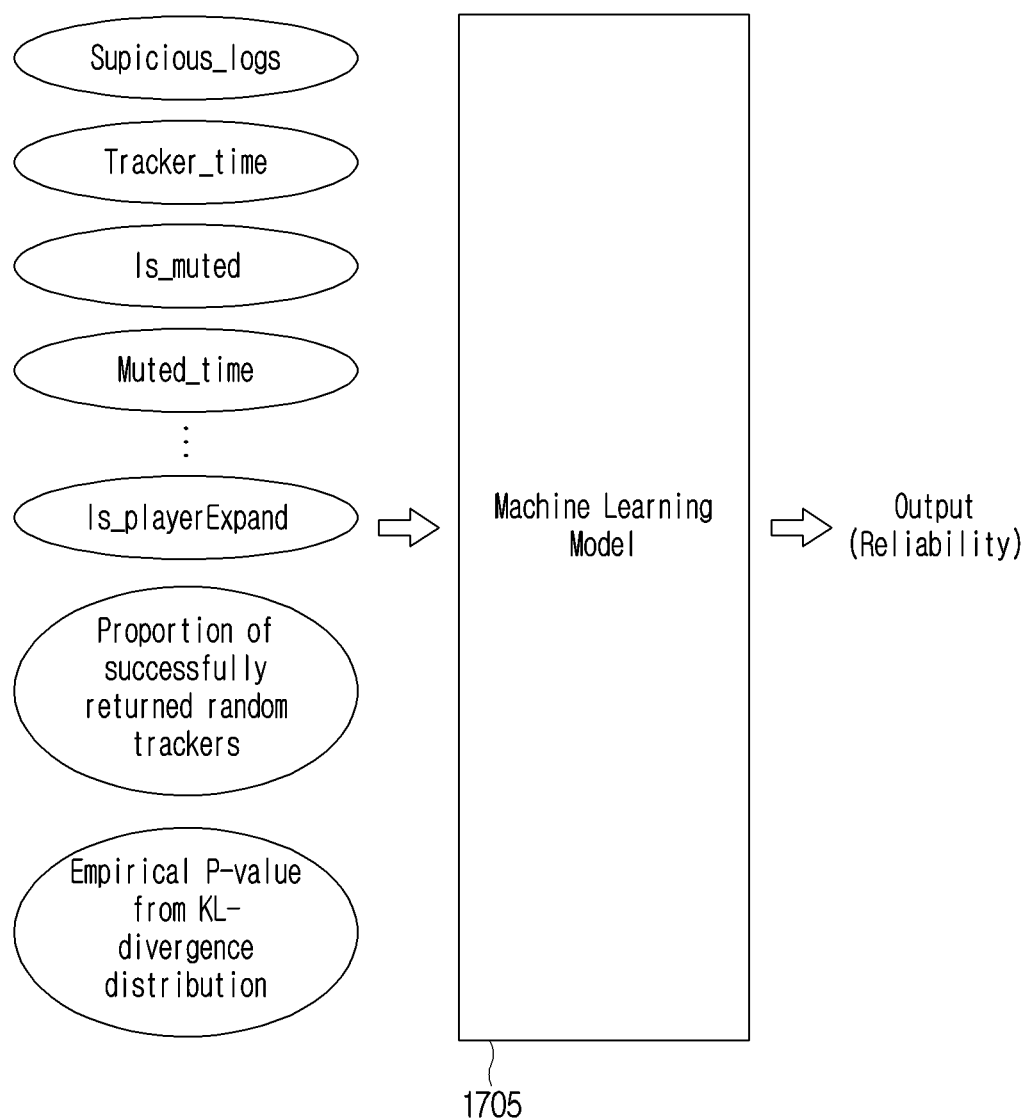
FIG. 17 is a diagram for illustrating a learning model for outputting reliability of an external device according to an embodiment.

FIG. 17 is a diagram for illustrating a learning model for outputting reliability of an external device.

Referring to FIG. 17, the electronic apparatus 100 may obtain reliability for an external device. Specifically, the electronic apparatus 100 may obtain reliability by using a machine learning model 1705. The electronic apparatus 100 may use at least one of information related to a first track log request, information related to a first track log response, or calculation information as input data of the machine learning model 1705.

Here, the information related to the first track log request may indicate the type of an event, the expected time of the event, etc. For example, the type of the event may indicate a predetermined that is indicative of an advertising scam event. The event may be reproduction, temporary pause, mute, volume change, screen size change, etc.

Here, the information related to the first track log response may indicate at least one of the time when the predetermined event occurred, the time when the first track log response was generated, or the time when the first track log response was received. The information related to the first track log response may include at least one of the time when temporary pause was activated, the time when mute was activated, the changed size of the volume, or the changed size of the screen.

Here, other information may indicate information related to a calculation method of obtaining reliability. Other information may include at least one of the type of the time which determines whether to use an absolute time or a relative time in the calculation method of first ratio values, the first ratio values, the average value of the first ratio values, second ratio values, the average value of the second ratio values, distribution rates of respective events that occurred in a first period, distribution rates of respective events that occurred in a second period, difference values of the distribution rates of the respective events that occurred in the first period and the second period, the average of the difference values, degrees of changes, or a P-value of Kullback-Leibler divergence (KL divergence, KLD).

The machine learning model 1705 may receive at least one of the information related to the first track log request, the information related to the first track log response, or the calculation information as input data, and calculate reliability as output data based on the received information.

FIG. 18 is a diagram for illustrating a control method of an electronic apparatus according to an embodiment.

Referring to FIG. 18, a control method of the electronic apparatus 100 according to an embodiment includes the operations of transmitting a content and a first track log request to the external device 200 (S1805), based on receiving a first track log response corresponding to the first track log request from the external device 200, obtaining a first ratio value between the time when the first track log response was received and a predetermined time corresponding to the first track log request (S1810), transmitting a second track log request to the external device 200 at a random time (S1815), identifying whether a second track log response corresponding to the second track log request is received from the external device 200 (S1820), and identifying whether the content is reproduced normally based on at least one of the first ratio value or whether the second track log response was received (S1825).

The control method may further include the operation of obtaining a second ratio value between a time when the second track log response was received and a predetermined time corresponding to the second track log request, and in the operation S1825 of identifying whether the content was reproduced normally, it may be identified whether the content was reproduced normally based on the first ratio value and the second ratio value.

In the operation S1825 of identifying whether the content was reproduced normally, based on the first ratio value being within a first threshold range and the second ratio value being within a second threshold range, it may be identified that the content was reproduced normally at the external device 200, and the second threshold range may be wider than the first threshold range.

The first track log request may include a control command requesting to transmit a track log regarding whether a predetermined event occurred at the external device 200, and the predetermined event may include at least one of a content start event, a content reproduction event, a content completion event, a temporary pause event, a reproduction input event, a forced termination event, a mute event, a volume change event, a screen size change event, a picture quality change event, or a reproduction speed change event.

The control method may further include the operation of, based on identifying that the first track log response is a track log generated based on occurrence of a predetermined event, counting the occurrences of the predetermined event and obtaining an accumulated value, and in the operation S1825 of identifying whether the content was reproduced normally, it may be identified whether the content was reproduced normally based on the obtained accumulated value.

The control method may further include the operation of determining the random time when the second track log request is transmitted based on the predetermined time corresponding to the first track log request.

The control method may further include the operations of transmitting the first track log request including a plurality of detailed requests to the external device 200, and based on receiving a plurality of first track log responses corresponding to the plurality of detailed requests from the external device 200, obtaining an average value of a plurality of first ratio values between the time when the plurality of first track log responses were received and a predetermined time corresponding to the plurality of detailed requests, and in the operation S1825 of identifying whether the content was reproduced normally, it may be identified whether the content was reproduced normally based on the obtained average value and whether the second track log response is received.

The control method may further include the operations of, based on the plurality of first track log responses received during a first period, obtaining first distribution rates of a plurality of respective events corresponding to the plurality of first track log responses, and based on the plurality of first track log responses received during a second period, obtaining second distribution rates of the plurality of respective events corresponding to the plurality of first track log responses, and in the operation S1825 of identifying whether the content was reproduced normally, it may be identified whether the content was reproduced normally based on the first distribution rates and the second distribution rates.

The control method may further include the operations of transmitting the first track log request including a content and a plurality of detailed requests to a plurality of external devices 200-1 to 200-$n$ and obtaining degrees of change corresponding to the plurality of respective external devices 200-1 to 200-$n$ based on the plurality of first track log responses received during the first period and the second period from the plurality of external devices 200-1 to 200-$n$, and in the operation S1825 of identifying whether the content was reproduced normally, based on a degree of change corresponding to one external device 200 among the plurality of external devices 200-1 to 200-$n$ being within a third threshold range, it may be identified that the content was reproduced normally at the external device 200, and the degree of change may be a value that relatively ranks the change of distribution of events that occurred during the first period and the second period at the external device 200 based on the plurality of first track log responses.

The control method may further include the operation of obtaining the reliability of the plurality of respective external devices 200-1 to 200-$n$ based on the first ratio values obtained from the plurality of respective external devices 200-1 to 200-$n$, whether the second track log response was received, and a difference value between the first distribution rate and the second distribution rate.

The control method as in FIG. 18 may be executed in an electronic apparatus having a configuration as in FIG. 1, and it may also be executed in electronic apparatuses having different configurations.

Methods according to the aforementioned various embodiments may be implemented in forms of applications that can be installed in electronic apparatuses.

Also, the methods according to the aforementioned various embodiments may be implemented by software upgrade, or hardware upgrade of electronic apparatuses.

In addition, the aforementioned various embodiments may be performed through an embedded server provided on an electronic apparatus, or an external server of at least one of an electronic apparatus or a display apparatus.

According to an embodiment, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include the electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term "non-transitory" means that a storage medium does not include signals, and is tangible, but does not distinguish whether data is stored in the storage medium semi-permanently or temporarily.

Also, according to an embodiment, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may include a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

The invention claimed is:

1. An electronic apparatus comprising:
a memory;
a communication interface; and
a processor configured to:
control the communication interface to transmit a content and a first track log request to an external device, wherein the first track log request is a request for a track log indicating reproduction of the content at a predetermined time,
based on a first track log response corresponding to the first track log request being received from the external device, obtain a first ratio value between a first track log response time corresponding to receipt of the first track log response and a predetermined first track log request time corresponding to the predetermined time,
control the communication interface to transmit a second track log request to the external device at a random time, wherein the second track log request is a request for a track log indicating reproduction of the content at the random time,
based on a second track log response corresponding to the second track log request being received from the external device, obtain a second ratio value between a second track log response time corresponding to receipt of the second track log response and a predetermined second track log request time corresponding to the random time, and
identify that the content was reproduced normally at the external device based on the first ratio value being within a first threshold range and the second ratio value being within a second threshold range.

2. The electronic apparatus of claim 1, wherein the second threshold range is wider than the first threshold range.

3. The electronic apparatus of claim 1, wherein the first track log request comprises a control command requesting the external device to transmit a track log indicating whether a predetermined event occurred at the external device, and
wherein the predetermined event comprises any one or any combination of a content start event, a content reproduction event, a content completion event, a temporary pause event, a reproduction input event, a forced termination event, a mute event, a volume change event, a screen size change event, a picture quality change event, and a reproduction speed change event.

4. The electronic apparatus of claim 3, wherein the processor is further configured to:
count occurrences of the predetermined event and obtain an accumulated value corresponding to the predetermined event based on the first track log response, and
identify whether the content is reproduced normally based on the accumulated value.

5. The electronic apparatus of claim 1, wherein the processor is further configured to identify the random time when the second track log request is transmitted based on the predetermined first track log request time.

6. The electronic apparatus of claim 1, wherein the processor is further configured to:

control the communication interface to transmit the first track log request comprising a plurality of detailed requests to the external device, based on a plurality of first track log responses corresponding to the plurality of detailed requests received from the external device, obtain an average value of a plurality of first ratio values between a plurality of first track log response times corresponding to receipt of the plurality of first track log responses and a plurality of predetermined first track log request times corresponding to the plurality of detailed requests, and identify whether the content is reproduced normally based on the average value and whether the second track log response is received.

7. The electronic apparatus of claim 6, wherein the plurality of first track log responses comprises a first plurality of first track log responses received during a first period and a second plurality of first track log responses received during a second period, and wherein the processor is further configured to:
based on the first plurality of first track log responses, obtain first distribution rates of a plurality of respective events corresponding to the first plurality of first track log responses,
based on the second plurality of first track log responses, obtain second distribution rates of the plurality of respective events corresponding to the second plurality of first track log responses, and
identify whether the content is reproduced normally based on the first distribution rates and the second distribution rates.

8. The electronic apparatus of claim 7, wherein a plurality of external devices comprises the external device, wherein the processor is further configured to:
control the communication interface to transmit the content and the first track log request to the plurality of external devices,
obtain degrees of change respectively corresponding to the plurality of external devices based on the first plurality of first track log responses and the second plurality of first track log responses from the plurality of external devices, and
based on a degree of change corresponding to one external device among the plurality of external devices being within a third threshold range, identify that the content was reproduced normally at the external device, and
wherein the degree of change is a value that relatively ranks the plurality of respective events that occurred during the first period and the second period at the external device based on the first plurality of first track log responses.

9. The electronic apparatus of claim 8, wherein the processor is further configured to obtain reliability of each of the plurality of external devices based on the first ratio value obtained from each of the plurality of external devices, whether the second track log response was received, and a difference value between the first distribution rates and the second distribution rates.

10. A method of controlling an electronic apparatus, the method comprising:
transmitting a content and a first track log request to an external device, wherein the first track log request is a request for a track log indicating reproduction of the content at a predetermined time;
based on a first track log response corresponding to the first track log request being received from the external device, obtaining a first ratio value between a first track log response time corresponding to receipt of the first track log response and a predetermined first track log request time corresponding to the predetermined time;
transmitting a second track log request to the external device at a random time, wherein the second track log request is a request for a track log indicating reproduction of the content at the random time;
based on a second track log response corresponding to the second track log request being received from the external device, obtaining a second ratio value between a second track log response time corresponding to receipt of the second track log response and a predetermined second track log request time corresponding to the random time; and
identifying that the content was reproduced normally at the external device based on the first ratio value being within a first threshold range and the second ratio value being within a second threshold range.

11. The method of claim 10, wherein the second threshold range is wider than the first threshold range.

12. The method of claim 10, wherein the first track log request comprises a control command requesting the external device to transmit a track log indicating whether a predetermined event occurred at the external device, and wherein the predetermined event comprises any one or any combination of a content start event, a content reproduction event, a content completion event, a temporary pause event, a reproduction input event, a forced termination event, a mute event, a volume change event, a screen size change event, a picture quality change event, and a reproduction speed change event.

13. The method of claim 12, further comprising:
counting occurrences of the predetermined event and obtaining an accumulated value corresponding to the predetermined event based on the first track log response,
wherein the identifying whether the content is reproduced normally comprises identifying whether the content is reproduced normally based on the accumulated value.

* * * * *